(12) United States Patent
Girshovitz et al.

(10) Patent No.: US 9,816,801 B2
(45) Date of Patent: Nov. 14, 2017

(54) SYSTEM AND A METHOD FOR QUANTITATIVE SAMPLE IMAGING USING OFF-AXIS INTERFEROMETRY WITH EXTENDED FIELD OF VIEW OR FASTER FRAME RATE

(71) Applicant: RAMOT AT TEL-AVIV UNIVERSITY LTD., Tel Aviv (IL)

(72) Inventors: Pinhas Girshovitz, Beer Sheva (IL); Natan Tzvi Shaked, Rishon Lezion (IL)

(73) Assignee: RAMOT AT TEL AVIV UNIVERSITY LTD, Tel Aviv (IL)

(*) Notice: Subject to any disclaimer, the term of this patent is extended or adjusted under 35 U.S.C. 154(b) by 54 days.

(21) Appl. No.: 15/072,756

(22) Filed: Mar. 17, 2016

(65) Prior Publication Data

US 2016/0305761 A1    Oct. 20, 2016

Related U.S. Application Data

(63) Continuation-in-part of application No. PCT/IL2014/050834, filed on Sep. 17, 2014.
(Continued)

(51) Int. Cl.
*G01B 9/02* (2006.01)
*G01B 9/04* (2006.01)
(Continued)

(52) U.S. Cl.
CPC ........ *G01B 9/0203* (2013.01); *G01B 9/02011* (2013.01); *G01B 9/02027* (2013.01); *G01B 9/02028* (2013.01); *G01B 9/02041* (2013.01); *G01B 9/02047* (2013.01); *G01B 9/02085* (2013.01); *G01B 9/02097* (2013.01);
(Continued)

(58) Field of Classification Search
CPC .............. G01B 9/0203; G01B 9/02043; G01B 9/02084; G01B 9/02087
See application file for complete search history.

(56) References Cited

U.S. PATENT DOCUMENTS 9,574,868 B2 * 2/2017 Shaked .............. G01B 9/02057
2004/0212807 A1 10/2004 Hanson et al.
(Continued)

FOREIGN PATENT DOCUMENTS

EP    1 148 390    10/2001

OTHER PUBLICATIONS

Edwards, et al., Optically monitoring and controlling nanoscale topography during semiconductor etching, Light: Science & Application, 2012, pp. 1-6, 1, e30.
(Continued)

*Primary Examiner* — Jonathan Hansen
(74) *Attorney, Agent, or Firm* — Browdy and Neimark, PLLC

(57) ABSTRACT

The present invention provides a sample inspection and quantitative imaging system and method for performing off-axis interferometric imaging while enabling to record off-axis holograms in an extended field of view (FOV) than possible using a given camera and imaging setup, and thus to enlarge (e.g. double, triple, or even more than this) the interferometric FOV, without changing the imaging parameters, such as the magnification and the resolution.

30 Claims, 20 Drawing Sheets
(19 of 20 Drawing Sheet(s) Filed in Color)

Related U.S. Application Data

(60) Provisional application No. 61/878,772, filed on Sep. 17, 2013.

(51) Int. Cl.
  *G02B 21/00* (2006.01)
  *G02B 21/14* (2006.01)
  *G03H 1/26* (2006.01)
  *G01B 11/06* (2006.01)
  *G02B 5/12* (2006.01)
  *G02B 17/08* (2006.01)
  *G02B 27/10* (2006.01)
  *G02B 27/28* (2006.01)
  *G03H 1/04* (2006.01)

(52) U.S. Cl.
  CPC ............... *G01B 9/04* (2013.01); *G01B 11/06* (2013.01); *G02B 5/12* (2013.01); *G02B 17/08* (2013.01); *G02B 21/0056* (2013.01); *G02B 21/14* (2013.01); *G02B 27/106* (2013.01); *G02B 27/283* (2013.01); *G03H 1/0443* (2013.01); *G03H 1/265* (2013.01); *G03H 2001/046* (2013.01); *G03H 2001/0445* (2013.01); *G03H 2001/0456* (2013.01)

(56) References Cited

U.S. PATENT DOCUMENTS

2012/0200901 A1* 8/2012 Dubois ................. G02B 21/00 359/15
2012/0307035 A1* 12/2012 Yaqoob .................... G01B 9/04 348/79

OTHER PUBLICATIONS

Ferraro, et al., Quantitative Phase Microscopy of microstructures with extended measurement range and correction of chromatic aberrations by multiwavelength digital holography, Optics Express, Oct. 2007, pp. 14591-14600, vol. 15, No. 22.
Frenklach, et al., Off-axis interferometric phase microscopy with tripled imaging area, Optics Letters, Mar. 2014, pp. 1525-1528, vol. 39, No. 6.
Gabolde, et al., Single-shot measurement of the full spatio-temporal field or ultrashort pulses with multi-spectral ligital holography, Optic Express, Nov. 2006, pp. 11460-11467, vol. 14, No. 23.
Girshovitz, et al., Compact and portable low-coherence interferometer with off-axis geometry for quantitative phase microscopy and nanoscopy, Optics Express, Mar. 2013, pp. 5701-5714, vol. 21, No. 5.
Girshovitz, et al., Doubling the field of view in off-axis low-coherence interferometric imaging, Light: Science & Applications, 2014, pp. 1-11, 3, e151.
Girshovitz, et al., Generalized cell morphological parameters based on interferometric phase microscopy and their application to cell life cycle characterization, Biomedical Optics Express, Aug. 2012, pp. 1757-1773, vol. 3, No. 8.
Liu, et al., Super-resolution digital holographic imaging method, Applied Physics Letters, Oct. 2002, pp. 3143-3145, vol. 81, No. 17.
Mico, et al., Superresolution digital holographic microscopy for three-dimensional samples, Optics Express, Nov. 2008, pp. 19260-19270, vol. 16, No. 23.
Paturzo, et al., Investigation of angular multiplexing and de-multiplexing of digital holograms recorded in microscope configuration, Optics Express, May 2009, pp. 8709-8718, vol. 17, No. 11.
Paturzo, et al., Super-resolution in digital holography by a two-dimensional dynamic phase grating, Optics Express, Oct. 2008, pp. 17107-17118, vol. 16, No. 21.
Shaked, Natan T., Quantitative phase microscopy of biological samples using a portable interferometer, Optics Letters, Jun. 2012, pp. 2016-2018, vol. 37, No. 11.
Uttam, et al., Optically multiplexed imaging with superposition space tracking, Optics Express, Feb. 2009, pp. 1691-1713, vol. 17, No. 3.
Wang, et al., Pulsed digital holography system recording ultrafast process of the femtosecond order, Optics Letters, Jun. 2006, pp. 1636-1638, vol. 31, No. 11.

\* cited by examiner

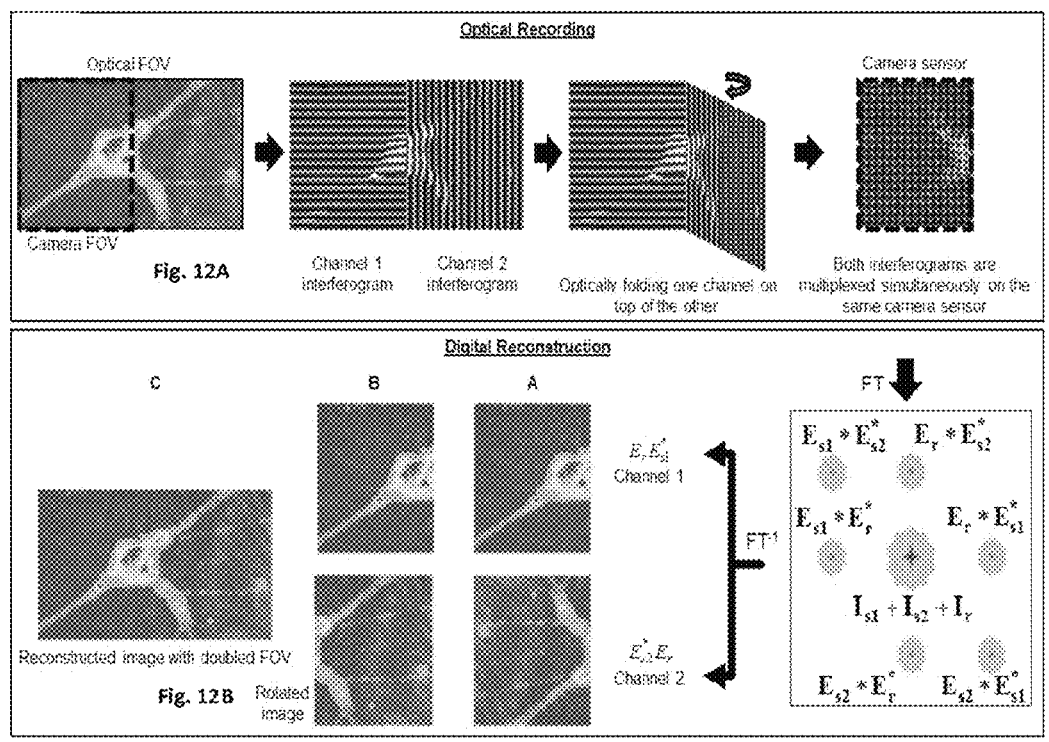

SYSTEM AND A METHOD FOR QUANTITATIVE SAMPLE IMAGING USING OFF-AXIS INTERFEROMETRY WITH EXTENDED FIELD OF VIEW OR FASTER FRAME RATE

TECHNOLOGICAL FIELD

This invention is generally in the field of interferometry, and relates to a quantitative sample imaging using off-axis interferometric measurements. The invention can be particularly used with a microscope or other imaging systems to acquire quantitative image for inspection of transparent, semi-transparent or reflective samples, and do it with extended field of view (FOV) or faster acquisition frame rate of the camera, if compared to the existing off-axis interferometric systems.

REFERENCES

[1] Girshovitz P, Shaked N T. Generalized cell morphological parameters based on interferometric phase microscopy and their application to cell life cycle characterization. Biomed Opt Exp 2012; 3: 1757-1773.

[2] Shaked N T. Quantitative phase microscopy of biological samples using a portable interferometer. Opt Lett 2012; 37: 2016-2019.

[3] Girshovitz P, Shaked N T. Compact and portable low-coherence interferometer with off-axis geometry for quantitative phase microscopy and nanoscopy. Opt Exp 2013; 12: 5701-5714.

[4] Uttam S, Goodman N A, Neifeld M A, Kim C, John R, Kim J et al. Optically multiplexed imaging with superposition space tracking. Opt Exp 2009; 17:1691-1713.

[5] Paturzo M, Memmolo P, Tulino A, Finizio A, Ferraro P. Investigation of angular multiplexing and de-multiplexing of digital holograms recorded in microscope configuration. Opt Exp 2009; 17: 8709-8718.

[6] Ferraro P, Miccio L, Grilli S, Paturzo M, De Nicola S, Finizio A et al. Quantitative phase microscopy of microstructures with extended measurement range and correction of chromatic aberrations by multiwavelength digital holography. Opt Exp 2007; 15: 14591-14600.

[7] Wang X, Zhai H, Mu G. Pulsed digital holography system recording ultrafast process of the femtosecond order. Opt Lett 2006; 31: 1636-1638.

[8] Gabolde P, Trebino R. Single-shot measurement of the full spatio-temporal field of ultrashort pulses with multispectral digital holography. Opt Exp 2006; 14: 11460-11467.

[9] Paturzo M, Merola F, Grilli S, De Nicola S, Finizio A, Ferraro P. Enhanced super-resolution in digital holography by a dynamic phase grating. Opt Exp 2008; 16: 17107-17118.

[10] Micó V, Zalevsky Z, Ferreira C, Garcia J. Superresolution digital holographic microscopy for three-dimensional samples. Opt Exp 2008; 16: 19260-19270.

[11] Edwards C, Arbabi A, Popescu G, Goddard L L. Optically monitoring and controlling nanoscale topography during semiconductor etching. Light Sci Appl 2012; 1: e30.

Acknowledgement of the above references herein is not to be inferred as meaning that these are in any way relevant to the patentability of the presently disclosed subject matter.

BACKGROUND

Digital interferometric and holographic imaging is a quantitative optical imaging technique, which is able to capture the complex wave-front (amplitude and phase) of the light interacted with a sample. This is performed by recording a spatial interference pattern of the beam interacted with the sample and a mutually-coherent reference beam using a digital camera. Digital interferometric and holographic imaging affected many fields of science, and one of them, is digital interferometric phase microscopy (IPM), also called digital holographic microscopy. IPM is a label-free quantitative tool for capturing the complex wave-front of transparent or translucent microscopic samples and processing it into the spatial optical thickness maps of the samples. This tool is useful for a wide range of applications, including biological cell imaging and nondestructive quality tests of optical elements [1,2].

Although it is easier to obtain interference with a highly coherent source, using such a source in interferometric and holographic imaging in general and in IPM in particular significantly reduces the image quality due to parasitic interferences and coherent noises. To overcome this problem, low-coherence light sources are employed. However, to obtain interference with these sources, meticulous alignment between the optical paths of the two beams is required. For off-axis interferometric geometry, which enables a single-exposure acquisition mode, the sample and the reference beams interfere on the digital camera with a small angle, so even with strict alignment between the beam optical paths, it is frequently not possible to obtain interference on the entire camera field of view (FOV), due to the angular beam-path difference inside the beam cross section, which might be above the coherence length of the source. The practical meaning of this limitation is that large samples cannot be simultaneously recorded by off-axis interferometry on the entire camera sensor using low-coherence sources. Diffractive gratings can solve this problem by tilting the field of the beams to be in plane, with the cost of possible aliasing and image modulation.

Even if using a highly coherent source, where the off-axis interference is obtained on the entire camera sensor, many interferometric setups are subjected to a small FOV of acquisition, as the size of the camera sensor used for the digital recording of the interferogram is smaller than the optical FOV defined by the microscope objective aperture projected onto the camera plane. This narrow camera-FOV restriction is especially critical when imaging large samples with fine details in high magnifications or when imaging dynamics of objects which might move out of the camera FOV.

GENERAL DESCRIPTION

The present invention provides inter alia a sample inspection and quantitative imaging system and method for performing off-axis interferometric imaging while enabling to record off-axis holograms in an extended field of view (FOV) than possible using a given camera and imaging setup, and thus to enlarge (e.g. double, triple, or even more than this) the interferometric FOV, without changing the imaging parameters, such as the magnification and the resolution. This technique enables scan-free quantitative amplitude and phase imaging of wider samples without losing the camera frame rate due to scanning. The system of the present invention enables to extend the recorded FOV, or alternatively to increase the camera frame rate without decreasing the original reconstructed FOV. The system comprises a compact and portable interferometric module associated with (e.g. attached to) an imaging system and a recording device (e.g. a regular digital camera) illuminated with a coherent or partially coherent illuminated source. For example, the optical arrangement can be connected between an existing holographic/interferometric system and a regular digital camera, or between a regular microscope illuminated by a coherent or low-coherence source and a regular digital camera, and provide a powerful off-axis holographic/interferometric setup with extended FOV. It should be noted that the gain in the FOV (or in the acquisition frame rate), is limited by the highest spatial frequencies of the image. The interferometric arrangement is useful to a wide range of applications, where neither the FOV nor the camera frame rate is compromisable. Using the holograms/interferograms acquired without scanning, the thickness profile of a sample can be recorded. The technique of the present invention can be implemented on various holographic and interferometric imaging systems, and can be connected directly to a digital camera and turn it into a powerful off-axis interferometric camera with an extended FOV.

It should be also noted that narrow camera FOV is a feature appearing also with different types of imaging modalities. For example, high-resolution, extended-FOV imaging is a principal requirement in the fields of security and situational awareness. Several optical configurations were suggested over the years to extend the recorded FOV without increasing the camera sensor size or losing resolution, but frequently with sacrifice of time resolution or extent of dynamic areas allowed in the recorded image.

The present invention provides optical arrangements and/or modules that extend the off-axis interferometric FOV without losing any time resolution. As stated above, certain modules can be connected to existing non-interferometric imaging systems (such as regular microscope), or certain optical arrangements can be connected to existing off-axis inteferometric systems. In both cases, extended off-axis interferometric FOV is obtained. According to one broad aspect of the present invention, there is provided an optical arrangement to be connected to an existing off-axis interferometer device having a certain off-axis interferometric FOV. The arrangement comprises: a beam splitter/combiner unit for receiving from the off-axis interferometer device a reference beam and a modulated beam and splitting the modulated beam into first and second light beams of the same amplitude and phase modulation and combining reflections of the first and second light beams paths to produce at least two output combined beams; at least two optical elements accommodated in the first and second optical paths of the first and second light beams for rotating the first and second light beams and reflecting the first and second light beams back towards the beam splitter/combiner unit. The at least two output combined beams are two off-axis overlapping interferograms to be optically multiplexed into a single off-axis multiplexed interferogram having an extended off-axis interferometric FOV as compared to the certain off-axis interferometric FOV of the above described interferometer alone.

The existing off-axis interferometer device is configured for defining at least two substantially overlapping optical beams towards an optical detector (such as a camera), where the beams interfere on the detector with a small angle in relation to each other (off-axis interferometer).

In some embodiments, one of the at least two optical element comprises at least one retro-reflector, at least one mirror, at least one right-angle prism, at least one corner reflector, at least one sided prism based retro-reflector, at least one cat's eye, at least one shifted mirror, at least one phase-conjugate mirror.

In some embodiments, the optical elements are accommodated with respect to each other at a controllable position to thereby control the off-axis interference. In this connection, it should be understood that appropriately adjusting the relative position of one optical element with respect to the other prevents the occurrence of irrelevant interferences. For example, as will be described further below, for low coherence sources, a small difference in the optical length can be maintained by appropriately controlling the position of the optical element, such a difference being higher than the coherence length, such that the two beams would not interfere.

Alternatively, the optical arrangement comprises at least one polarizing element accommodated on the optical path in the optical arrangement. The polarizing element creates orthogonal polarizations of the first and second optical paths with respect to each other. The polarizing element is configured and operable to prevent the occurrence of irrelevant interferences.

According to another broad aspect of the present invention, there is also provided an off-axis interferometric module to be connected to an existing non-interferometric optical system for performing off-axis interferometric imaging with extended FOV. The interferometric module comprises: a first beam splitter/combiner unit for receiving an input beam and splitting the input beam into first and second light beams; a Fourier optics assembly comprising two lenses, one lens being in a 4f configuration with respect to the other; a first lens being accommodated at the input of the first beam splitter and a second lens being accommodated at the output of the first beam splitter; a reflective surface accommodated in the first optical path of the first light beam to direct the first light beam back to the first beam splitter/combiner; a spatial filter comprising a pinhole accommodated in front of the reflective surface for receiving and spatially filtering the first light beam to thereby create a reference beam with respect to the second modulated beam; a second beam splitter/combiner unit for receiving the second modulated light beam, splitting the second modulated light beam into third and fourth light beams; at least two Fourier shifting element accommodated in the first and second optical paths of the third and fourth light beams for creating a Fourier-plane shift of the third and fourth light beams and reflecting the third and fourth light beams back towards the second beam splitter/combiner unit. The reflected reference beam and the third and fourth beams create at least two interferences respectively being two off-axis overlapping interferograms to be optically multiplexed into a single off-axis multiplexed interferogram having an extended interferometric FOV as compared to the regular off-axis interferometric FOV.

In some embodiments, at least one Fourier shifting element comprises at least one retro-reflector, at least one mirror, at least one right-angle prism, at least one corner reflector, at least one sided prism based retro-reflector, at least one cat's eye, at least one shifted mirror, at least one phase-conjugate mirror.

In some embodiments, one of the retro-reflector is configured for shifting the third beam in one plane and the other retro-reflector is configured for shifting the fourth beam in a second plane.

In some embodiments, the module comprises at least two polarizing elements each placed upstream to the at least two Fourier shifting element. The polarizing element may be orthogonal to each other.

In some embodiments, the module comprises three beam splitters.

In some embodiments, at least one of the first and second beam splitters includes at least one of a double and triple beam splitter.

In some embodiments, at least two retro-reflectors are oriented at a predetermined angle with respect to each other.

According to another broad aspect of the present invention, there is also provided a sample inspection and quantitative imaging system, comprising: a light collecting and focusing optics configured and operable for collecting an input beam from a predetermined sample surface and focusing it onto an image plane; a light source illuminating the sample; and an off-axis interferometric module accommodated in a path of the light collected by the light collecting and focusing optics and being connected at the output of an imaging system; the off-axis interferometric module being configured as defined above. The imaging system may be a microscope.

In some embodiments, the system comprises a control unit configured and operable to receive from the detector a multiplexed interferogram containing at least two overlapping images and to apply digital spatial filtering a predetermined number of times to thereby extract an extended FOV quantitative profile of the sample. This extended FOV can be composed of FOVs being at adjacent locations on the sample, so that the final extended FOV would be continuous. Alternatively, the extended FOV can be composed of FOVs being at non-adjacent locations on the sample, so that the final extended FOV will be discrete.

According to another broad aspect of the present invention, there is also provided a sample inspection and quantitative imaging system, comprising a sample inspection and quantitative imaging system. The imaging system comprises a light collecting and focusing optics configured and operable for collecting an input beam from a predetermined sample surface and focusing it onto an image plane; a light source illuminating said sample; an off-axis interferometer device having a certain off-axis interferometric FOV accommodated in a path of the light collected by the light collecting and focusing optics, and being connected at the output of the imaging system; wherein the device is configured for defining at least two substantially overlapping optical paths towards an optical detector; and an optical arrangement to be connected to the off-axis interferometer device as defined above.

In some embodiments, the optical arrangement, the off-axis interferometric module and the system of the present invention allows doubling the off-axis interferometric FOV. Since two interferometric channels are multiplexed in a single FOV, a single extended image can be reconstructed, which is equal in size to twice the off-axis interferometric FOV that can be conventionally recorded by the camera in a single exposure. When a coherent illumination source is used, interferences on the entire camera sensor are obtained and the FOV of the entire camera sensor can be doubled regardless of the initial interference area. Hence, when the interferometric FOV is smaller than the camera sensor, the interferometric FOV can be doubled. When the interferometric FOV is larger than the camera sensor, the FOV can be doubled with respect to the size of the entire camera sensor. In other words, in some embodiments, the optical arrangement, the off-axis interferometric module and the system of the present invention provides a technique of interferometry with doubled-imaging area, which is capable of doubling the off-axis interferometric FOV without using special optical elements. This is performed by optically multiplexing two off-axis orthogonal interferograms of the sample on the same camera sensor using a novel optical arrangement or a novel off-axis interferometric module. In contrast to non-interferometric methods, and without losing time resolution, the technique of the present invention optically multiplexes two FOVs into a single off-axis multiplexed interferogram in order to obtain simultaneous imaging with wider FOV.

In some embodiments, the optical arrangement, the off-axis interferometric module and the system of the present invention allows tripling the off-axis interferometric FOV.

In some embodiments, the optical arrangement, the off-axis interferometric module and the system of the present invention may be used with low-coherence light sources and enables to solve the limited off-axis interference area associated with off-axis interferometric setups integrated with low-coherence light sources. In case off-axis interference is not obtained on the entire camera sensor due to low-coherence illumination, the system of the present invention creates an interference area which is extended compared to the initial low-coherence interference area. In case off-axis interference is obtained on the entire camera sensor, the technique of the present invention may be used to extend the entire camera FOV without compromising on imaging parameters, such as magnification and resolution. On the other hand, as explained above, since narrowing the FOV of the digital camera can help speeding up the camera frame rate, the technique also enables faster acquisition rates of highly dynamic objects or phenomena, while recording half of the original camera FOV and still being able to reconstruct the original FOV, without resolution loss.

It should be noted that the system and method of the present invention does not influence the digital image file size, which enables processing larger data sets without stocking up the computer memory.

According to another broad aspect of the present invention, there is also provided a method comprising: receiving a reference beam and a modulated beam from an off-axis interferometer device and splitting the modulated beam into first and second light beams of the same amplitude and phase modulation by using a beam splitter/combiner unit, reflecting the first and second light beams back towards the beam splitter/combiner unit; rotating the first and second light beams; receiving and combining reflections of each of the first and second light beams with the reference beam to produce at least two output combined beams propagating along at least two substantially overlapping optical paths; wherein the at least two output combined beams create two off-axis overlapping interferences to be optically multiplexed into a single off-axis interferogram having an extended off-axis interferometric FOV, as compared to the certain off-axis interferometric FOV.

In some embodiments, the method comprises comprising controlling the off-axis interference by controlling at least one of interfering wave angle by the position of optical elements configured for rotating the first and second light beams. It should be noted that the off-axis interference is created because of the angle between the two beams. Changing the angle in relation to the camera normal plane (Z axis) changes the interference frequency and changing the angle in relation to the camera plane (X,Y axis) changes the direction of the interference. As will be described below, in some of the possible configurations (excluding FIG. 5), the rotation of the retro-reflector creates the rotation of the interference, and moving the retro-reflector in the direction orthogonal to the propagation changes the frequency. Therefore, the controlling of the off-axis interference may be obtained by changing the angle of one of the beams with respect to the three axes.

In some embodiments, the method comprises receiving and spatially filtering the first light beam to thereby create a reference beam with respect to the second modulated beam; splitting the second modulated light beam into third and fourth light beams; and creating a Fourier-plane shift of the third and fourth light beams and reflecting the third and fourth light beams back towards a second beam splitter/combiner unit; wherein the reflected reference beam and the third and fourth beams creates at least two interferences respectively being two off-axis overlapping interferograms to be optically multiplexed into a single off-axis multiplexed interferogram.

In some embodiments, the method comprises shifting the third beam in one plane and shifting the fourth beam in a second plane.

In some embodiments, the method comprises collecting an input beam from a predetermined sample surface and focusing it onto an image plane; illuminating the sample surface.

In some embodiments, the method comprises receiving a multiplexed interferogram containing at least two overlapping images and applying a digital spatial filtering a predetermined number of times to thereby extract an extended FOV quantitative profile of the sample.

In some embodiments, the method comprises acquiring the multiplexed interferogram simultaneously in a single detector exposure.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIG. 8A shows a multiplexed interferogram captured by a digital camera; FIG. 8B shows a digital spatial-frequency domain (absolute value) of the interferogram; FIG. 8C shows a stitched quantitative phase profile;

FIG. 12A shows an intuitive explanation for the optical recording of the system of the present invention for extending the FOV by a factor of 2; FIG. 12B shows the digital reconstruction carried out after the optical recording of the doubled FOV quantitative profile of the sample;

FIG. 14A shows a multiplexed interferogram recorded in a single digital-camera exposure; FIG. 14B shows a spatial Fourier transform of the multiplexed interferogram containing two fields of view together; FIG. 14C shows a final optical and physical thickness map of the test target with a double FOV; FIG. 14D shows a regular off-axis interferogram with magnification reduced by a factor of two; FIG. 14E shows a spatial Fourier transform of the regular interferogram, showing the autocorrelation and the cross-correlation elements; FIG. 14F shows a reconstructed optical thickness map obtained from the reduced-magnification, regular off-axis interferogram reconstruction shown in FIG. 14F, demonstrating the resolution and quality loss compared to FIG. 14C;

FIG. 15A shows a network of two nerves connected to an unspread glial cell; FIG. 15B shows a neural sample containing both nerves and glial cells;

in FIGS. 17B-17D the physical thickness profile of an element at different time points during the curing of a photoresist in a lithography process is shown;

FIG. 19A shows an optically multiplexed interferogram in which in the upper boxes a magnified region from this multiplexed interferogram show the interference pattern of the different FOVs and of the irrelevant interference; FIG. 19B shows a Fourier (spatial-frequency) domain of FIG. 19A; FIG. 19C shows reconstructed wrapped phase images of the three FOVs;

FIG. 21A shows a multiplexed off-axis interferogram containing three FOVs; FIGS. 21B-21D show reconstructed quantitative unwrapped phase profiles of the three FOVs of FIG. 21A; and;

DETAILED DESCRIPTION OF EMBODIMENTS

The system and method of the present invention have been used to obtain detailed phase images of many samples including brain cell samples, rapid movement of sperm cell, and rapid photolithography process. More specifically, the system and method of the present invention was used for scan-free quantitative optical thickness imaging of biological microscopic samples, including live neurons and rapid, high-magnification imaging of human sperm cell in motion and for examining photolithography process. As explained above, the system and method of the present invention can be integrated into any commercially available holographic and interferometric imaging setups or other non-interferometric imaging systems, providing wider holographic field of views (FOVs) or faster acquisition rates for a given camera, and thus enabling to image larger and rapidly-changing samples. The system and method of the present invention can also be used for nondestructive quality-testing profilometry of non scattering structures as for other applications where the sample wavefront is maintained. Finally, since each channel contains not only the quantitative phase map but also the intensity profile of the sample, the technique of the present invention can be used in reflection mode on non-transparent samples to create panoramic images and gain extended FOVs.

Figure 1A:
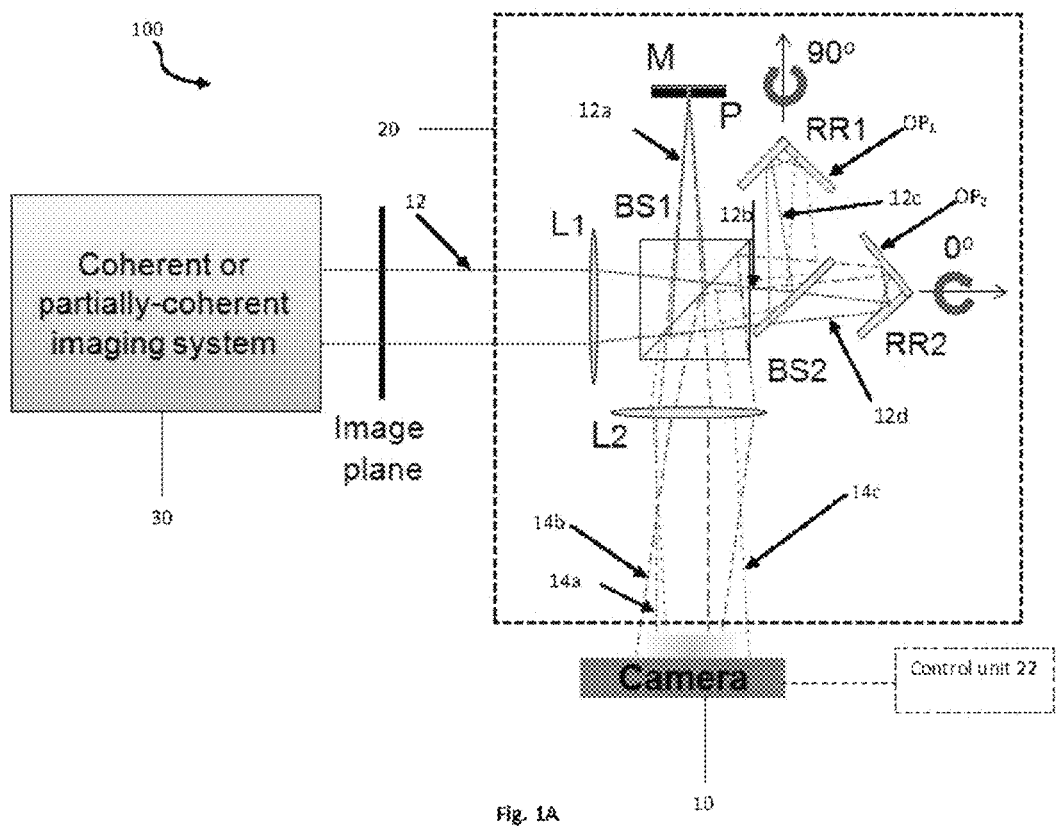
FIG. 1A illustrates an off-axis interferometric module of the present invention located at the output of a coherent of partially-coherent imaging system for doubling the field of view (FOV) according to some embodiments of the present invention.
Figure 1B:
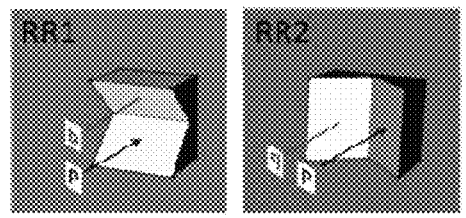
FIG. 1B illustrates an example of a three-dimensional scheme of retro-reflectors and their effect on the incoming image.
Figure 7:
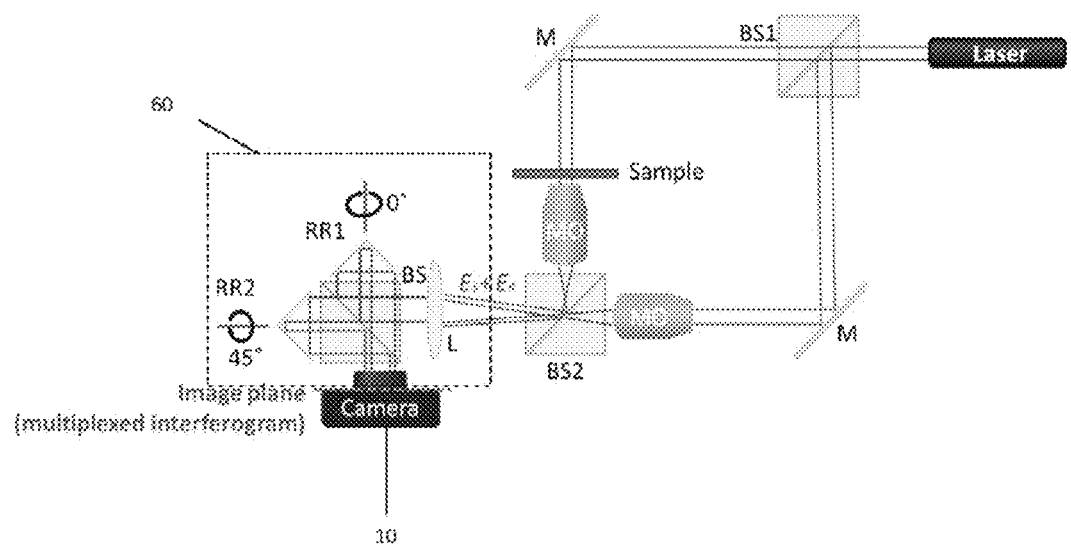
FIG. 7 illustrates the off-axis interferometric module of FIG. 5 integrated into a Mach-Zehnder IPM system.
Figure 11:
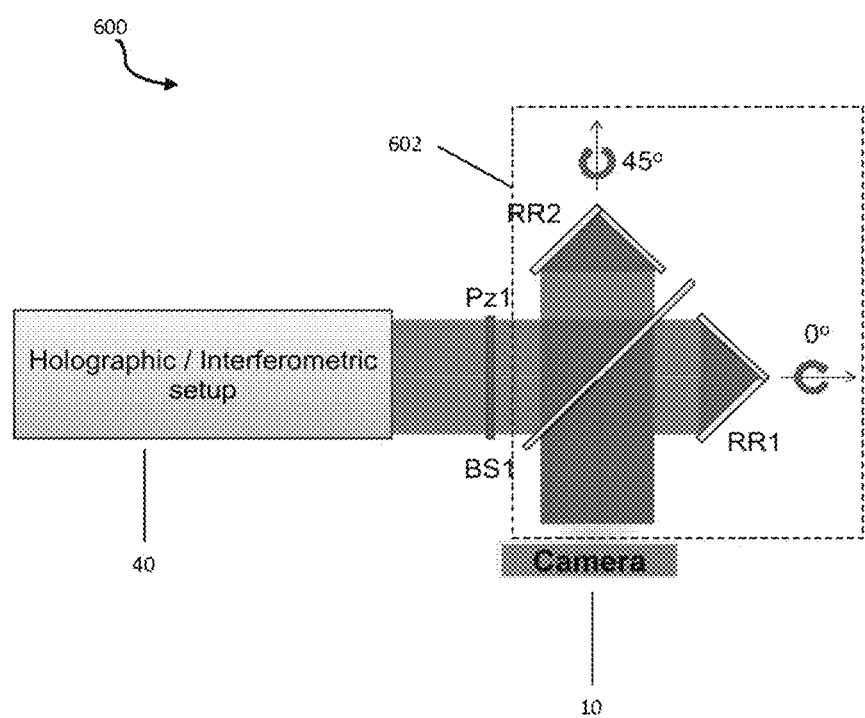
FIG. 11 illustrates another example an optical arrangement of the present invention to be attached to an existing off-axis interferometric setup capable of increasing the interferometric FOV recorded by the camera by a factor of 2 without a 45 degrees interference using orthogonal polarizations.

Reference is made to FIG. 1A representing a possible non-limiting configuration of the system according to some embodiments of the present invention. In this specific and non-limiting example, the system 100 comprises a portable interferometric module 20 for performing off-axis interferometric imaging to be connected to a digital camera 10 located at the output of an imaging system 30. In this connection, it should be understood that the system of the present invention includes two main types of configurations for extending FOVs: an off-axis interferometric module to be connected to an existing imaging system, and an optical arrangement to be attached to an existing off-axis interferometric imaging system. The configurations described in FIGS. 1-4 illustrate possible off-axis interferometric module embodiments while the configurations described in FIGS. 5, 7, 11 illustrate possible optical arrangement embodiments.

The image from a coherently or partially-coherently illuminated object/sample is projected onto the input of the module 20, instead of directly onto the digital camera 10. A magnified image of a sample is formed by light beams 12 presenting amplitude and phase modulation of an input light incident on a sample, the amplitude and phase modulation being indicative of the sample's effect on light passing there through or from the sample. The interferometric module 20 receives input light 12 of certain amplitude and phase modulation and direct the light to an optical detector 10 (e.g. digital camera) where an interference pattern is detected being indicative of the amplitude and phase modulation. The interferometric module 20 includes a first beam splitter/combiner unit BS1 for receiving input beam 12 of the amplitude and phase modulation and splitting it into first and second light beams 12a and 12b, and directing one of them (beam 12a in the present example) through a spatial filter P placed in the Fourier plane of one of the interferometric arms to enable amplitude and phase demodulation thereof and formation of a reference beam with respect to the other modulated beam. The pinhole transfers only a very small bandwidth around the DC spatial frequency, and thus creates a reference beam by effectively erasing the sample information [2,3]. The spatial filter P is configured for receiving and filtering the first light beam 12a. Further provided in the interferometric module 20 is a reflective surface M accommodated in the first optical path of the first light beam to direct the first light beam 12a back to the first beam splitter/combiner unit BS1. Further provided in the interferometric module 20 is a second beam splitter/combiner unit BS2 for receiving second light beam 12b of the amplitude and phase modulation and splitting it again into third and fourth light beams 12c and 12d. Further provided in the interferometric module 20 are two retro-reflectors RR1 and RR2 accommodated in the optical paths $OP_1$ and $OP_2$ of the third and fourth light beams 12c and 12d configured for creating a Fourier-plane shift of the third and fourth light beams and directing the third and fourth light beams back to the second beam splitter/combiner unit BS2. RR1 shifts the third beam 12c in one plane (horizontal for example) and RR2 shifts the fourth beam 12d in another plane (vertical for example). The reflected beams from paths 12a, 12c and 12d interact on the camera 10. If two FOVs with straight parallel fringes having orthogonal directions compared to each other are desired as shown for example in FIG. 12A, the plane should be perpendicular to each other. The interferometric module 20 thus defines first and second substantially overlapping optical paths $OP_1$ and $OP_2$ with the optical beam 12a towards the camera 10. These optical paths serve for propagation of first and second optical beams of substantially the same amplitude and phase modulation to thereby enable interaction between the beams in these paths with beam 12a at the camera 10 to produce the interference patterns. In other words, the third and fourth light beams 12c and 12d from $OP_1$ and $OP_2$ interact with beam 12a to create the interference patterns and in addition, two beams 12b and 12c interact with each other to create an irrelevant interference pattern. In some of the configurations this interaction (irrelevant interference pattern) is eliminated as will be illustrated further below with respect to FIG. 2 and FIG. 11.

Generally, in order to create a small angle between the sample beams and the reference beam, and enable an off-axis interferogram, the actual Fourier plane center, is shifted using a retro-reflector RR. To shift the actual Fourier plane center one can use for example a pair of mirrors attached to each other in a right angle, at least one right-angle prism, three mirror retro-reflectors, at least one corner reflector, three sided prism based retro-reflector, at least one cat's eye, at least one shifted mirror, at least one grating configuration such as phase-conjugate mirror and more. The two retro-reflectors RR1 and RR2 may be controllably positioned perpendicular in relation to each other, whereas one creates a Fourier-plane shift in the x direction and the other one creates a Fourier-plane shift in the y direction as illustrated in the three-dimensional scheme of the retro-reflectors in FIG. 1B. Another way for shifting the Fourier plane center for coherent light-sources is to use two mirrors shifted from the focal point of the beams, when one mirror is angled in one plane and the second mirror is positioned in another plane.

Further provided in the interferometric module 20 is a Fourier optics assembly configured for applying Fourier transform to an optical field of the input beam 12 and for applying inverse Fourier transform to an optical field of the first second and third combined beams 14a 14b and 14c propagating from the first beam/splitter combiner BS1 to the camera 10. The image is thus optically Fourier transformed by lens L1, while being split into two beams using beam splitter BS1. This Fourier optics assembly is thus formed by lenses $L_1$ and $L_2$, where lens $L_1$ is located at a distance equals to its focal length from the image plane of the imaging system. The first lens $L_1$ is accommodated at the input of the first beam splitter BS1, thus, the image plane is Fourier transformed by lens L1 and then splits it into first and second beams 12a and 12b by a cube beam splitter/combiner BS1. The second lens $L_2$ is accommodated at the output of the first beam splitter BS1. The reference beam 12a is optically Fourier transformed back to the camera plane by lens L2. The second beam 12b that propagates from BS1 is split again by beam splitter BS2 and both sample beams 12c and 12d are reflected by two retro-reflectors, RR1 and RR2, and optically Fourier transformed back to the camera plane by lens L2. One of the beams 12a (defined as the reference beam) is reflected by the element M and spatially filtered by a spatial filter P constituted by a pinhole and accommodated in front of the reflective surface M, located after lens L1 at a distance of the focal length of lens L1, and then Fourier transformed back to the camera plane using lens L2, located at a distance of the focal length of L2 from M, and the camera is located after L2 at the image plane of L2. The pinhole demodulates one of the light beam thereby erasing the sample information by only passing the lowest frequencies (close to zero) of the image Fourier transform, thus effectively creating a reference beam with respect to the second beam, still containing the full sample information. Thus, the spatial filtering effectively creates a reference beam by erasing the sample information from the first beam, and also increases the beam spatial coherence and enables quantitative interference on the camera. The dashed lines are the reflected beams—the path of the invert Fourier from the Fourier plane to the camera (image plane). The solid lines are the directly transmitted beams from the microscope (image plane) to the Fourier plane. The other beam 12b (defined as the sample beam) is split by the second beam splitter BS2 in the third and fourth optical paths of the third and fourth light beams 12c and 12d to direct the third and fourth light beams back to the second beam splitter/combiner unit BS2 that also directs the second combined beam to the first beam splitter/combiner unit BS1. Another lens L2, positioned in 4f configuration with the first lens L1, back Fourier transforms the first second and third combined beams 14a 14b and 14c and projects it onto a detector 10, e.g. a digital camera, where an interference pattern results from interaction of the reference and modulated beams in the image plane and an interferogram of the sample is created.

This module 20 creates multiplexing of two linear, perpendicular off-axis interference fringe patterns 14b and 14c that can be recorded simultaneously by a single camera exposure. This multiplexing may be performed by an optional control unit 22 receiving a multiplexed interferogram containing the two overlapping images from the detector 10. The control unit 22 is configured and operable to apply at least one digital spatial filtering a predetermined number of times to thereby extract an extended FOV quantitative profile of the sample. Since the retro-reflectors RR1 and RR2 also rotate the image of the sample, two mirrored images are obtained on the camera. According to this arrangement, there is an area where the two overlapping images from the two retro-reflectors are continuous, meaning that the image reflected from retro-reflector RR1 is in continuation with the image reflected from retro-reflector RR2. In this area, two different complex wave fronts originated from two continuous FOVs of the sample can be reconstructed. Since these wave fronts are mirrored, one of them needs to be digitally rotated (as will be illustrated in step B of the bottom channel in FIG. 12B) and stitched to the first one, so that an image with a doubled FOV can be created (as will be illustrated in step C of the in FIG. 12B).

Figure 12C:
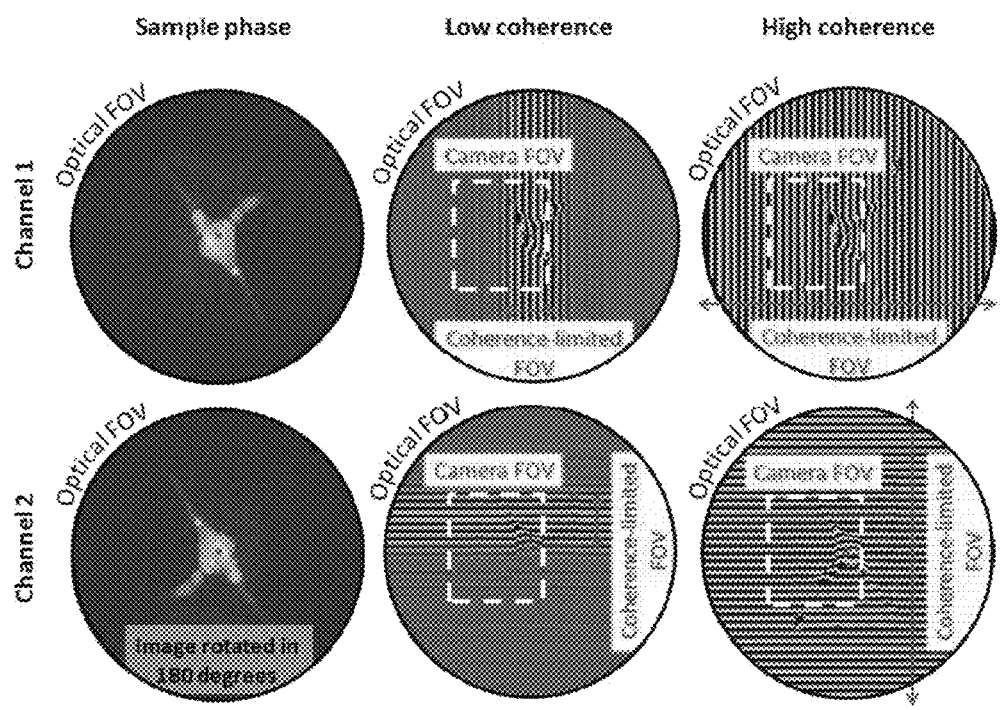
FIG. 12C shows the difference between the optical FOV, camera FOV and the coherence-limited interferometric FOV for the two imaging channels in the cases of high-coherence illumination and low-coherence illumination.

When using a low-coherence source, the off-axis interference area is typically limited by the coherence length of the source. This area might be smaller than the camera sensor size. However, since the module 20 records two independent interferences, each channel has its own interference area limited by the coherence length of the source. For this reason, it is possible to double the interferometric FOV using the technique of the present invention even if using a low-coherence source that limits the interferometric FOV provided that the camera sensor is square, whereas for other camera sensor geometries, significant interferometric FOV extension, which is close to doubling, is possible. FIG. 12C illustrates the connection between the optical FOV, the camera FOV, and the coherence-limited interferometric FOV for the cases of high-coherence and low-coherence sources.

Figure 1C:
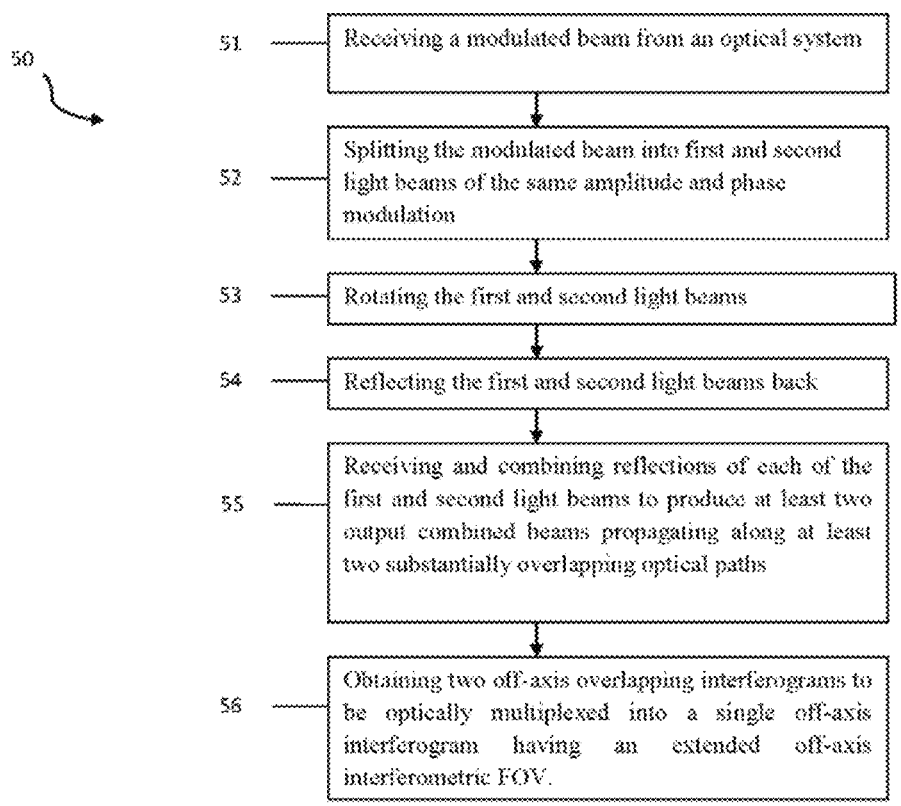
FIG. 1C schematically generally illustrates a method for extending the FOV according to some embodiments of the present invention.

Reference is made to FIG. 1C schematically illustrating a general method for extending the FOV according to some embodiments of the present invention. The method 50 comprises steps 51 to steps 56. In particular, step 51 of receiving a modulated beam from an optical system. If the system is connected to an off-axis interferometer device as illustrated for example in FIG. 5, step 51 comprises receiving reference beam and a modulated beam. If the optical system is not an off-axis reference beam, the method comprises the step (not shown) of creating a reference beam. The step 52 comprises splitting the modulated beam into first and second light beams of the same amplitude and phase modulation. The step 53 comprises rotating the first and second light beams. The step 54 comprises reflecting the first and second light beams back towards the beam splitter/combiner unit. The step 55 comprises receiving and combining reflections of each of the first and second light beams to produce at least two output combined beams propagating along at least two substantially overlapping optical paths. The at least two output combined beams create two off-axis overlapping interferences to be optically multiplexed into a single off-axis multiplexed interferogram having an extended off-axis interferometric FOV, as compared to a certain off-axis interferometric FOV as illustrated in step 56. It should be noted that some steps may be added to the above-described method as illustrated in the figures below.

Figure 2:
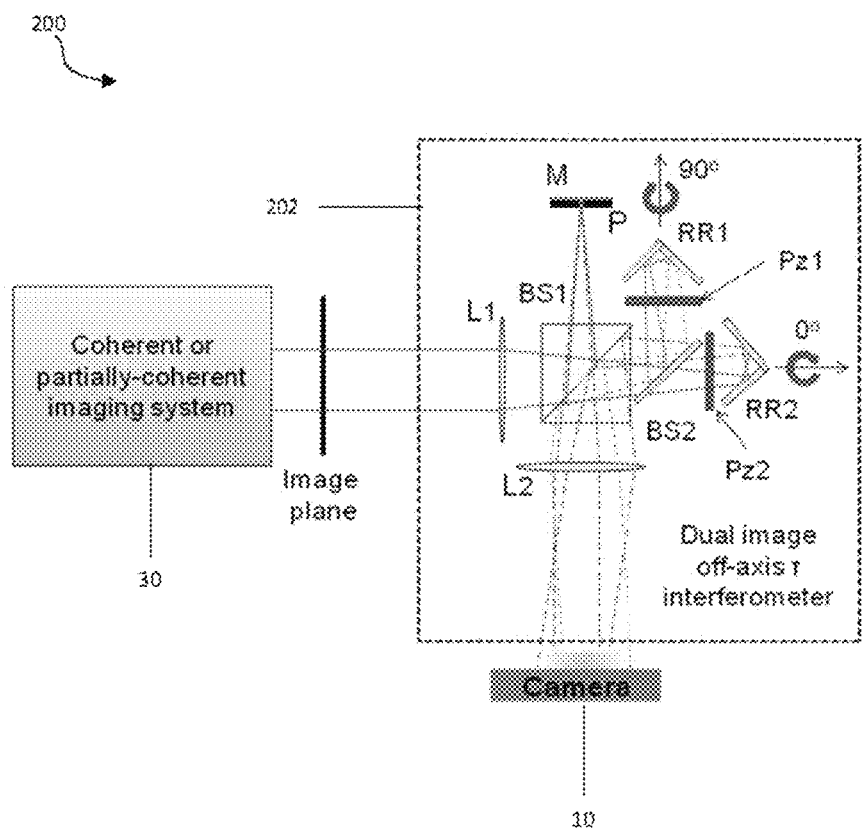
FIG. 2 illustrates another example of an off-axis interferometric module of the present invention for doubling the FOV without a 45 degrees interference using orthogonal polarizations according to other embodiments of the present invention.
Figures 14A, 14B, 14C, 14D, 14E, 14F:
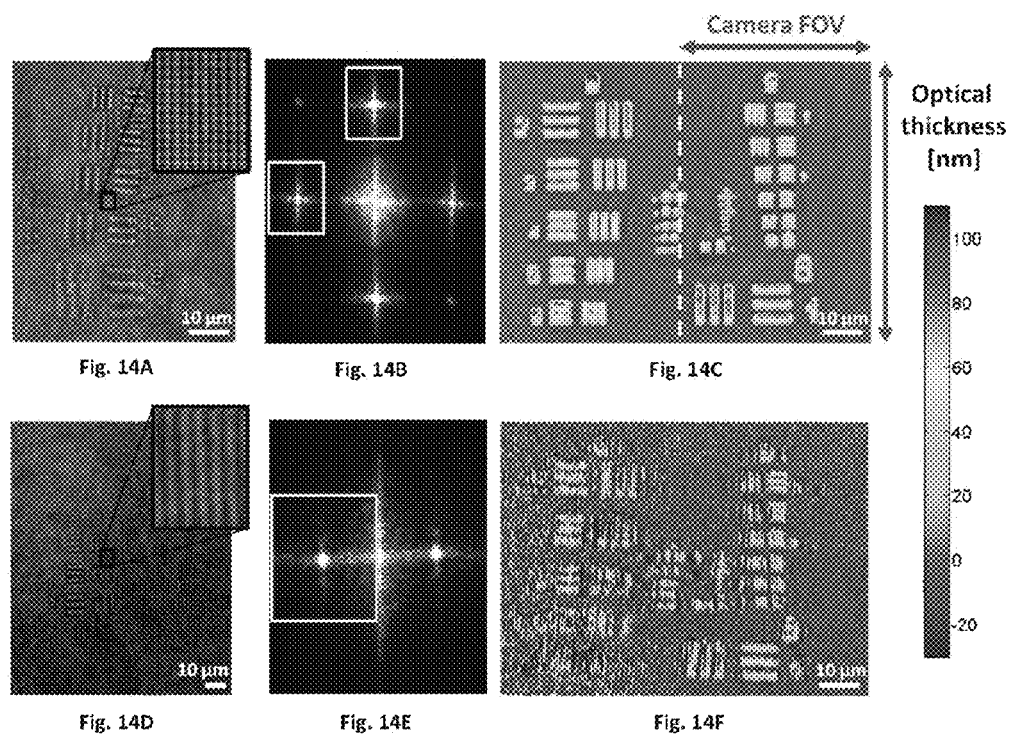
FIGS. 14A-14F show measurements of an optically transparent 1951-USAF phase test target under low-coherence illumination limiting the off-axis interferometric FOV made by using the configuration shown in FIG. 13 of the system of the present invention; in particular

Reference is made to FIG. 2 representing another possible non-limiting configuration of the sample inspection system of the present invention. The sample inspection system 200 comprises an off-axis interferometer module 202, connected to the digital camera 10 located at the output of a coherent or partially-coherent imaging system 30. The off-axis interferometer module 202 includes the same elements as described with respect to the configuration of FIG. 1A and further includes two polarizing elements Pz1 and Pz2 placed upstream to the retro-reflectors RR1 and RR2. Instead of two polarizing elements Pz1 and Pz2, one polarizing element such as a polarizing beam splitter may be used as well. In this specific and non-limiting example, the polarizing elements Pz1 and Pz2 are orthogonal with respect to each other. The input beam can be polarized at any polarizing for example at 45 degrees as compared to Pz1 and Pz2. However other polarizations of the input beam (other than orthogonal to Pz1 or Pz2) would work as well. It should be noted that if the input beam is polarized at 90 degrees as compared to a polarizing plate, the input beam would be absorbed and an interferogram would not be created. The polarizing plates Pz1 and Pz2 ensure that the two sample beams will not interfere with each other, so that the 45 degree interference as seen in FIGS. 12b and 14b will not appear. By this way, more spatial frequency contents are available. It should also be noted the polarizing plates can be combined in the beam splitter/combiner to form a polarized beam splitter/combiner.

Figure 3:
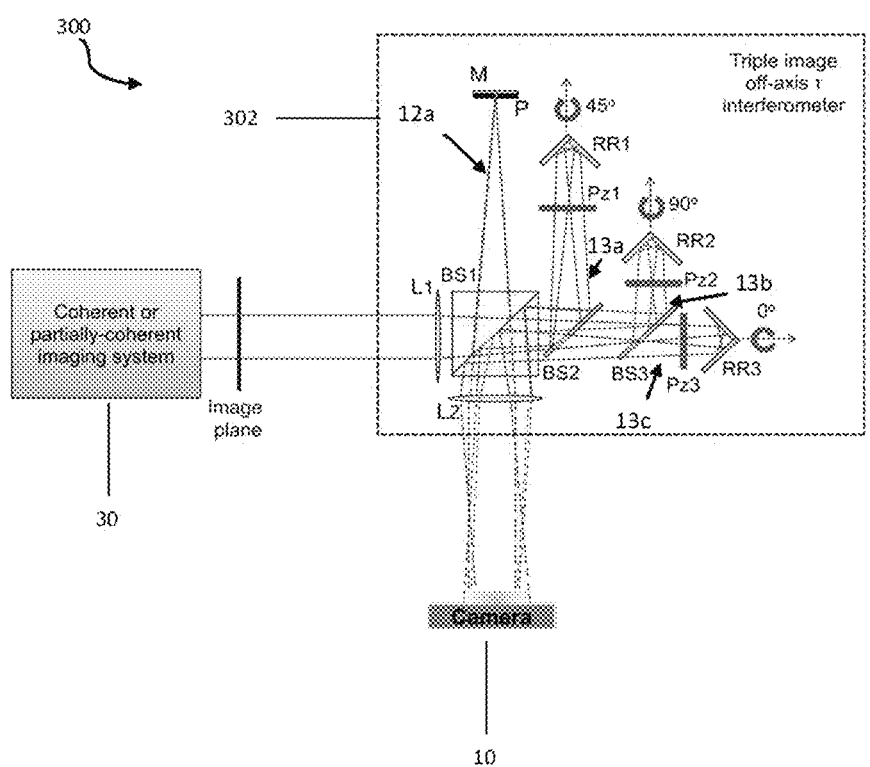
FIG. 3 illustrates an off-axis interferometric module capable of extending the interferometric FOV recorded by a camera by a factor of 3 according to some embodiments of the present invention.

Reference is made to FIG. 3 representing another possible non-limiting configuration of the sample inspection system of the present invention according to some embodiments of the present invention. The system 300 comprises an off-axis interferometer module 302, connected to the digital camera 10 located at the output of a coherent or partially-coherent imaging system 30. The off-axis interferometer module 302 is configured and operable to increase the interferometric FOV recorded by the camera 10 by a factor of 3. The off-axis interferometer module 202 includes the same elements as described with respect to the configuration of FIG. 2 but includes three beam splitters BS1, BS2, and BS3 instead of two, and three retro-reflectors RR1, RR2, RR3 instead of two and three polarizing plates Pz1, Pz2 and Pz3 (two polarizing plates orthogonal to the third polarizing plate) placed upstream to the retro-reflectors RR1, RR2, RR3. Although not shown, alternatively, BS2 can also be a polarizing beam splitter eliminating the use of the polarizing elements. The retro-reflectors rotate the beams in the angle listed near each retro-reflector compared to each other. However it should be noted that the angles of the different retro-reflectors are variable and that this configuration is only a non-limiting example for the sake of illustration. Each beam reflected from the retro-reflector should maintain elements of the polarization of its polarizer. In this example, this is achieved by using retro-reflectors that maintain at least a part of the original polarization direction. By using this configuration, three interactions are created. A first interaction between the first filtered light beam 12a and a first beam 13a reflected from the first retro-reflector RR1, a second interaction between the first filtered light beam 12a and a second beam 13b reflected from the second retro-reflector RR2, and a third interaction between the first filtered light beam 12a and a third beam 13c reflected from the third retro-reflector RR3.

Figure 4:
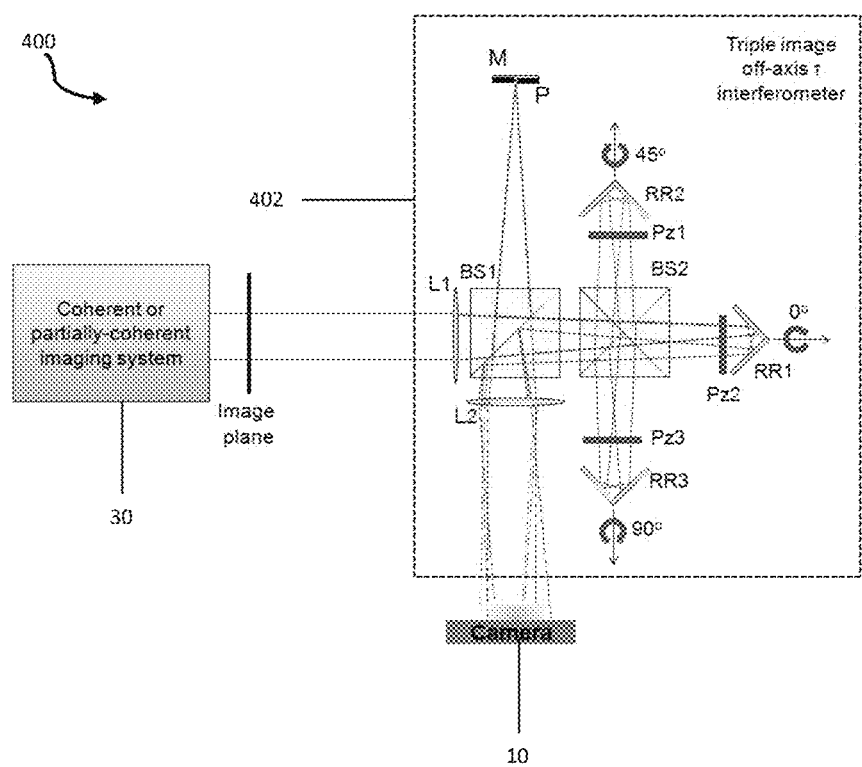
FIG. 4 illustrates another example of an off-axis interferometric module capable of extending the interferometric FOV recorded by a camera by a factor of 3 according to other embodiments of the present invention.
Figure 5:
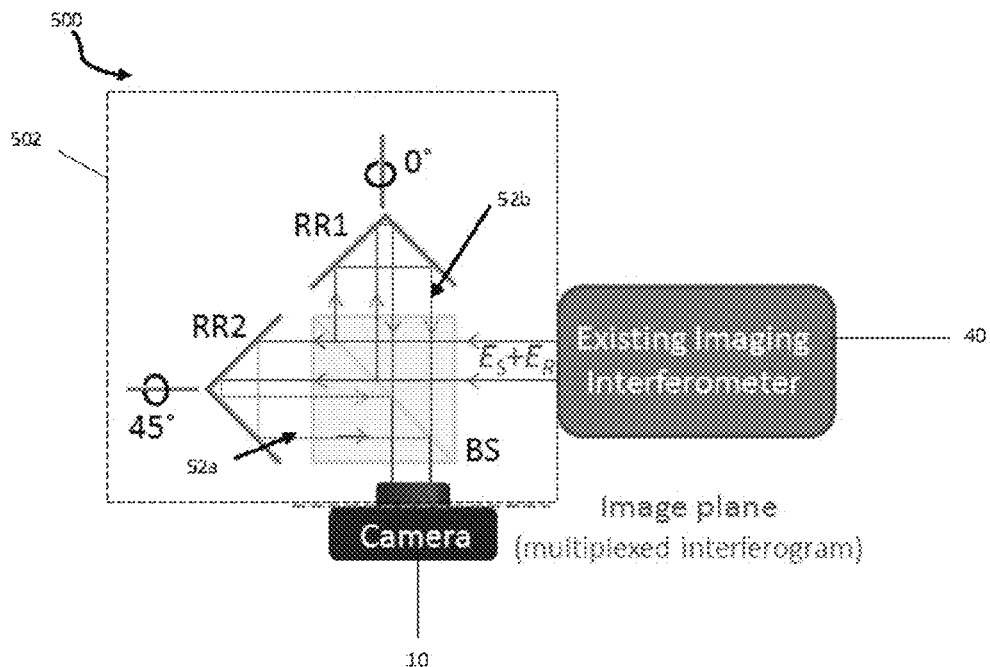
FIG. 5 illustrates an optical arrangement of the present invention to be connected before the output of an existing off-axis interferometric setup, capable of increasing the interferometric FOV recorded by a camera by a factor of 2, according to some embodiments of the present invention.

Reference is made to FIG. 4 representing another possible non-limiting configuration of the system of the present invention according to some embodiments of the present invention. The system 400 comprises an off-axis interferometer module 402, connected to the digital camera 10 located at the output of a coherent or partially-coherent imaging system 30. The off-axis interferometer module 402 is configured and operable to increase the interferometric FOV recorded by the camera 10 by a factor of 3. The off-axis interferometer module 402 includes the same elements as described with respect to the configuration of FIG. 3 but includes two beam splitters: a regular beam splitter BS1 and a triple beam splitter BS2 rather than three separate beam splitters. The retro-reflectors are located in the angle listed near each retro-reflector compared to each other. Namely RR1 is located at an angle of 0° with respect to RR3, RR2 is located at an angle of 45° with respect to RR1, RR3 is located at an angle of 90° with respect to RR2. A also mentioned above, the angles of the different retro-reflectors are arbitrary and are variable.

Reference is made to FIG. 5 representing another possible non-limiting configuration of the system of the present invention according to some embodiments of the present invention. The system 500 comprises an optical arrangement 502 configured to be connected to an existing off-axis interferometric setup 40 and to be positioned before the output of the existing interferometric system 40 and converts it in to a setup with double imaging capabilities and is connected to the digital camera 10. The image plane of the interferometric system is on the digital camera 10, on which the multiplexed off-axis image interferogram is created. The existing off-axis interferometric device is configured for defining first and second substantially overlapping optical paths towards an optical detector having a certain FOV. The optical arrangement 502 is configured and operable to increase the interferometric FOV recorded by the camera 10 by a factor of 2. The superposition between the sample and reference beams ($E_S+E_R$), created by the interferometric system, is split by beam splitter BS into two parts, each of which is reflected back by a retro-reflector (RR1 or RR2), and combined by the same beam splitter BS onto the digital camera 10. The arrangement 502 includes one beam splitter/combiner BS for receiving from the existing off-axis interferometer device a reference and modulated beams and splitting the modulated beam into first and second light beams 52a and 52b of the same amplitude and phase modulation and the reference beam into third and fourth light beams and combining reflections of the first light beam 52a with the third (reference) light beam and of the second light beam 52b and fourth (reference) light beam to produce two output combined beams.

Further provided in the optical arrangement 502 are two optical elements RR1 and RR2 accommodated in the first and second optical paths of the first and second light beams 52a and 52b. At least one optical element is configured for rotating the beams of the first and second light beams 52a and 52b at different angles and reflecting the first and second light beams back towards the beam splitter/combiner unit BS. The first and second light beams 52a and 52b each combined with a reference beam creates two off-axis overlapping images. In this specific and non-limiting example, retro-reflector RR1 does not rotate the fringe direction or the light polarization. Retro-reflector RR2 is rotated at 45° around the optical axis, and therefore, the interference fringes on the camera, the image of the sample, and the light polarization are 90° rotated. Therefore, the two imaging channels create two perpendicularly rotated interference patterns on the camera 10, composing the multiplexed image interferogram, which is captured by the camera 10 in a single exposure. It should be noted that in case that there is no space before the output of the interferometric system 40 for positioning the optical arrangement 502, an additional optional 4f lens configuration can be integrated after the interferometric system output to project the image plane of the interferometric system 40 onto the camera 10, which leaves space for positioning the optical arrangement 502. In this case, the optical arrangement 502 can be completely external to the existing interferometric system 40. The optical elements RR1 and RR2 may be located at the angle listed near each retro-reflector compared to each other. Namely RR1 may be located at an angle of 0° with respect to RR2; RR2 may be located at an angle of 45° with respect to RR1. For example, at least one optical element may be a retro-reflector. The combined output beams are two off-axis overlapping interferograms to be optically multiplexed into a single off-axis multiplexed interferogram having an increased FOV as compared to the certain FOV of the optical detector. To prevent irrelevant interferences, a linear polarizer may be placed between the interferometric setup and the optical arrangement 502 as illustrated in FIG. 11.

The digital processing for extraction of the doubled-area complex wave front may be performed as follows:

In the case of a linearly polarized light, the multiplexed interferogram, recorded on the digital camera in a single exposure, can be defined as follows:

$$|E_S^{(0°)}+E_R^{(0°)}+E_S^{(90°)}+E_R^{(90°)}|^2 = |E_S^{(0°)}|^2 + |E_R^{(0°)}|^2 + |E_S^{(90°)}|^2 + |E_R^{(90°)}|^2 + E_S^{(0°)}E_r^{*(0°)} + E_r^{(0°)}E_s^{*(0°)} + E_s^{(90°)}E_r^{*(90°)} + E_r^{(90°)}E_s^{*(90°)}, \quad (1)$$

where $E_S^{(0°)}$ and $E_R^{(0°)}$ represent the sample and reference beams reflected from the un-rotated retro-reflector, and $E_S^{(90°)}$ and $E_R^{(0°)}$ represent the sample and reference beams reflected from the 45° rotated retro-reflector, inducing 90° rotation of the interference fringes, the sample image, and the light polarization, compared to the first pair of beams. The first four elements on the right side of Eq. (1) represent the intensities of the sample and reference beams for the un-rotated and the 90°-rotated parts, and in the spatial-frequency domain they are located around the center of the axes. The next four elements in this equation represent, in the spatial-frequency domain, the cross-correlation pairs for the un-rotated and the 90°-rotated parts, each of which is shifted from the center of this domain, due to the off-axis angle between the reference and sample beams, and each pair is perpendicular to the other pair due to the 90° rotation between the parts. It should be noted that in Eq. (1), there are no interferences between the un-rotated and the 90°-rotated parts. Since linearly-polarized light reaches the module, these two parts will have orthogonal polarizations and thus they will not interfere with each other. Hence, additional cross-correlations in the spatial-frequency domain are eliminated.

Figure 6:
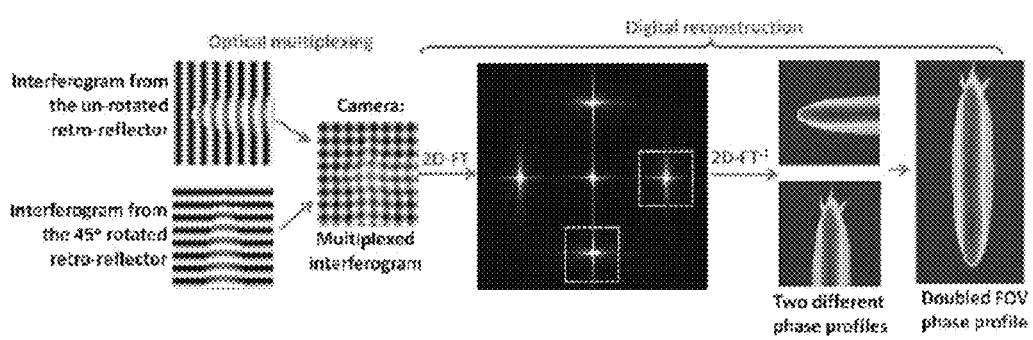
FIG. 6 shows a recording principle and a digital processing of the multiplexed interferogram obtained by using the module of FIG. 5 into two different quantitative phase profiles.

As seen in FIG. 6, after a digital 2-D Fourier transform and selection of one cross-correlation from each pair, both cross-correlations may be processed separately by a digital 2-D inverse Fourier transform, to obtain the complex wave fronts of the two sample FOVs. Then, removal of static noise and beam curvature may be performed by dividing the complex wave fronts by those resulting from a multiplexed interferogram without the sample present.

The quantitative phase profile of each of the FOVs can be retrieved by applying an unwrapping algorithm on the argument of the complex wave front to solve $2\pi$ ambiguities. For this aim, the 2D-SRNCP phase unwrapping algorithm was used. Finally, if the two FOVs of the sample encoded into the multiplexed interferogram are continuous, they can be stitched together to get one extended image.

In order to demonstrate the interferometric module capabilities, it was integrated before the output of a conventional Mach-Zehnder IPM setup, built vertically for live-cell imaging. As shown in FIG. 7, in this non-limiting setup, a 632.8 nm, 8 mW Helium-Neon laser light is split by a beam splitter BS1 to sample and reference beams. The sample beam is projected by mirrors and passes though the sample, positioned on a XYZ micrometric stage. The sample image is magnified by a microscope objective (60×0.85 numerical aperture). In parallel, the reference beam, which does not interact with the sample, is projected by mirrors directly onto a compensating microscope objective, which is identical to the first objective. This diverging reference beam is combined at a small off-axis angle with the sample beam in beam splitter BS2, and the beam superposition is projected through a tube lens with a focal length of 15 cm. The off-axis angle of the interferometric module 60 that creates the interference spatial frequency is captured by the digital camera 10 (e.g. DCC1545M, Thorlabs, containing 1024× 1280 square pixels, of 5.2 µm each, acquisition rate: 12 frames per second). Typically, the digital camera 10 should have been located at the image plane of the interferometric system (e.g. 40 or 50) about 15 cm after the tube lens depending on the interferometric system, where a regular off-axis image interferogram of the sample should have been recorded. This interferogram would enable reconstruction of a single interferometric FOV, containing the complex (amplitude and phase) profile of the sample. Instead, the interferometric multiplexing module 60 was positioned in the gap between the tube lens L (defined as a lens position after an infinity corrected objective creating an image at the focal point of the lens) and the camera 10, so that the image plane of the interferometric optical arrangement 502 was still on the digital camera 10, which, as explained above, allows recoding of a multiplexed off-axis image interferogram, containing two sample FOVs simultaneously, and enables their full reconstruction.

Figures 8A, 8B, 8C:
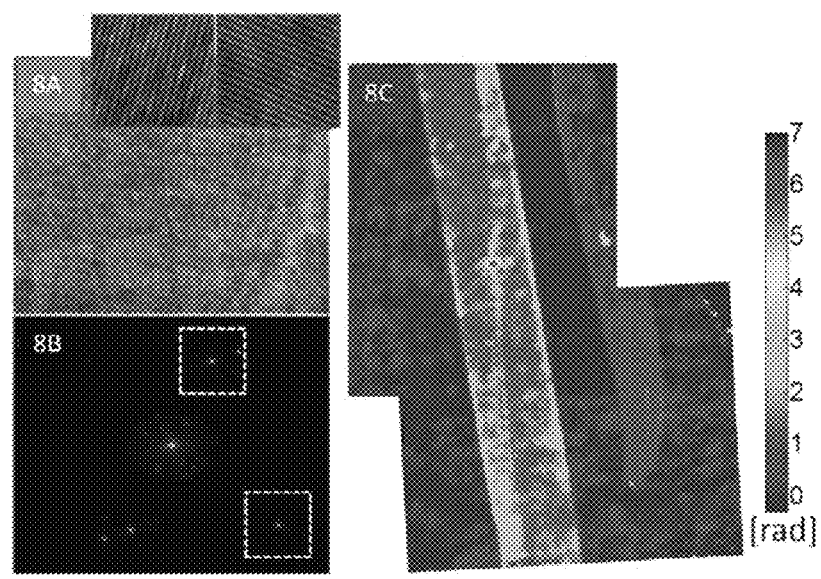
FIGS. 8A-8C show microscopic diatom shells, as captured by using the system of FIG. 7.

In some experiments made using the interferometric system of FIG. 7, microscopic diatom shells which are, under the chosen magnification, wider than the camera FOV, and thus cannot be recorded in a single exposure in the conventional way, were captured. FIG. 8A presents the recorded multiplexed interferogram, containing the two FOVs, represented by interferences with perpendicular fringes, and recorded using a single camera exposure. After a digital Fourier transform, each of the two interferences creates a pair of cross correlations in the spatial-frequency domain illustrated in FIG. 8B. After choosing one cross-correlation from each cross-correlation pair and digitally inverse Fourier transform it, separately from the other one, the two complex wave fronts were obtained that can contain information from two sample FOVs. The alignment of the experimental optical system has been done so that there is a small overlap between the two FOVs, which helps in stitching them together. FIG. 8C shows the stitched quantitative phase profile of the diatom shells, with 80% increase in the imaging area compared to each of the original FOVs separately.

Figure 9:
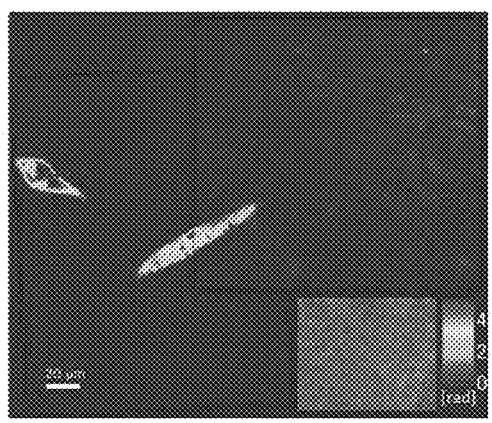
FIG. 9 shows *euglena gracilis* swimming in water, as captured by using the system of FIG. 7.
Figure 10:
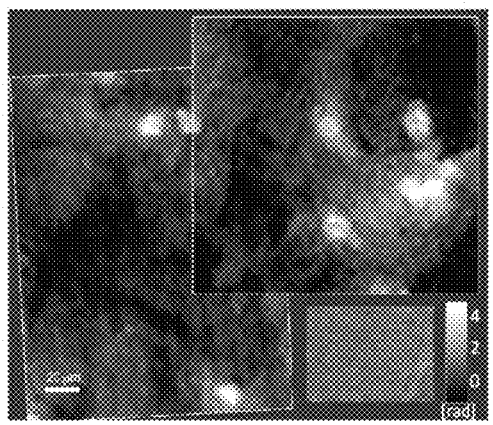
FIG. 10 shows confluent monolayer of contracting cardiomyocytes, as captured by using the system of FIG. 7.

Next, the dynamic capabilities of the module of the present invention being able to capture two interferometric FOVs simultaneously were demonstrated. FIG. 9 presents the stitched quantitative phase profile of a live microorganism called *Euglena gracilis*, as it rapidly swims in water. The microorganism moved fast from one FOV to the other. The captured multiplexed interferogram is shown, where the off-axis fringes are too fast to be seen. In this multiplexed interferogram, it is still possible to see the *Euglena* swimming towards the left side and simultaneously appears at the top side of the interferogram. This happens due to the small overlap area between the two FOVs, which were left to ease the stitching between the final phase profiles. Another demonstration of the dynamic capabilities of the module of the present invention is shown in FIG. 10, where confluent monolayer of contracting cardiomyocytes was imaged in two FOVs simultaneously.

Therefore, the present invention enables to double the FOV of existing off-axis interferometric imaging systems, and thus enhance their capabilities. The present invention allows inter alia simultaneous acquisition of two FOVs in a single camera exposure, and thus obtains the quantitative phase profile of dynamic biological phenomena.

Reference is made to FIG. 11 representing another possible non-limiting configuration of the system of the present invention according to some embodiments of the present invention. The system 600 comprises an optical arrangement 602 configured to be attached to an existing off-axis interferometric setup 40 and converts it in to a setup with double imaging capabilities and is connected to the digital camera 10. The optical arrangement 602 is configured and operable to increase the interferometric FOV recorded by the camera 10 by a factor of 2. The optical arrangement 602 includes the same elements as described with respect to the configuration of FIG. 5 and further includes one polarizing element Pz1 that is placed before the optical arrangement 602.

Although some specific and non-limiting examples are described in the configurations described above, it should be noted that the invention is not limited to the embodiments shown in the drawing and described above. Other elements and other detailed embodiments for an arrangement extending the FOV, for preventing irrelevant interferences, as well as other beam splitting/combining and rotation techniques are imaginable within the frames of this invention. The specific angles and elements described above are only examples given for the sake of illustration. Other elements or angles having the same function are conceivable as well.

Reference is made to FIGS. 12A-12B illustrating a dual-image off-axis interferometric multiplexing implemented optically. FIG. 12A shows an optical recording in which a digital camera records a multiplexed interferogram in a single exposure. As shown in FIG. 12A, the technique of the present invention is based on optically multiplexing two FOVs of the sample and interfere them with a reference beam in off-axis geometry, where the off-axis interferences from the two FOVs create straight parallel fringes with orthogonal directions compared to each other, in a way that the two parts of the image of the sample are recorded simultaneously on a single camera sensor. This profile is extracted digitally using spatial filtering applied twice according to the teachings of the present invention. In case tripling the FOV, a similar process is carried out, in which the three fields of view are extracted and stitched together to a single extended FOV.

As mentioned above, the first beam splitter creates a reference beam and then the second beam splitter creates two sample beams therefore, in this example, the same reference beam is used for the two FOVs of the sample. The digital camera at the output of the interferometric system records three separable off-axis interferences, two between the reference beam and each of the sample beams and one between the two sample beams. Mathematically, this multiplexed interferogram can be described by the following equation:

$$|E_{s1}+E_{s2}+E_r|^2 = |E_{s1}|^2+|E_{s2}|^2+|E_r|^2+E_{s1}E^*_{s2}+E_{s2}E^*_{s1}+E_{s1}E^*_r+E_rE^*_{s1}+E_rE^*_{s2}+E_{s2}E^*_r, \quad (2)$$

where $E_{s1}$ and $E_{s2}$ are the sample waves of two sample FOVs, and $E_r$ is the reference wave. According to the technique of the present invention, by controlling the interference angle, the off-axis interference between $E_{s1}$ and $E_r$ can be orthogonal (rotated at 90 degrees) to the off-axis interference between $E_{s2}$ and $E_r$. As a result, the off-axis interference between $E_{s1}$ and $E_{s2}$ will be rotated at 45 degrees compared to any of the other two interferences patterns. If the sample does not polarize the light interacting with it, this 45-degrees-rotated interference can be avoided by making sure that the two interferograms will be created by orthogonally polarized light beams as illustrated for example in FIG. 2.

FIG. 12B shows a digital reconstruction of the recorded image. The doubled-FOV quantitative profile of the sample is extracted digitally using spatial filtering applied twice. The bolded Es represent the spatial Fourier transforms of the coinciding Es (see Eq. (1)), and * between two Es represents spatial convolution. In the spatial frequency domain, the first three elements on the right side of Eq. (2) are the zero-orders of the interferogram, representing the intensities of the recorded waves. The other six elements on the right side of Eq. (1) represent the cross-correlations terms between the waves. According to the orthogonal off-interference angles, and as illustrated in FIG. 12B, these six cross-correlation elements can be located on different areas on the Fourier plane. Therefore, two sample waves, corresponding to two sample FOVs, can be digitally extracted from the single multiplexed interferogram. It should be noted that regular off-axis interferometry, for capturing a single FOV, uses a single sample beam and a single reference beam, which results in two autocorrelation elements (elements 1 and 3 on the right side of Eq. (2)) and two complex-conjugated cross-correlation elements (elements 6 and 7 on the right side of Eq. (2)). Assuming that the maximum spatial frequency of the sample wave is $\omega_c$ (on each axis), each of the cross-correlation elements occupies spatial bandwidth of $[-\omega_c, \omega_c]$, whereas the autocorrelation elements occupy spatial bandwidth of $[-2\omega_c, 2\omega_c]^{28}$. In this case, to avoid an overlap between the cross-correlation elements and the autocorrelation elements, the center of the spatial frequency contents of the cross-correlation elements is shifted to at least $\pm 3\omega_c$ by inducing the off-axis angle between reference and sample beams, which requires a total spatial bandwidth of at least $8\omega_c$. This encoding creates an empty space in the spatial frequency domain, to which the additional cross-correlation elements appearing in Eq. (2) is inserted, and thus FOV multiplexing is possible.

The reconstruction process includes a digital off-axis interferometric digital processes (described in details in publication [3]), applied twice. At the first time, it includes spatial filtering of $E_{s1}E^*_r$, and in the second time it includes spatial filtering of $E_{s2}E^*_r$. The two FOVs of the sample can be chosen to be located in adjacent places on the sample, so that after the reconstruction process a single continuous and doubled-size FOV of the sample can be obtained, as illustrated in FIG. 12B.

FIG. 12C shows the relations between the optical FOV, camera FOV and the coherence-limited interferometric FOV for the two imaging channels in the cases of high-coherence illumination and low-coherence illumination. The dots indicate the center of the optical FOV.

Figure 13:
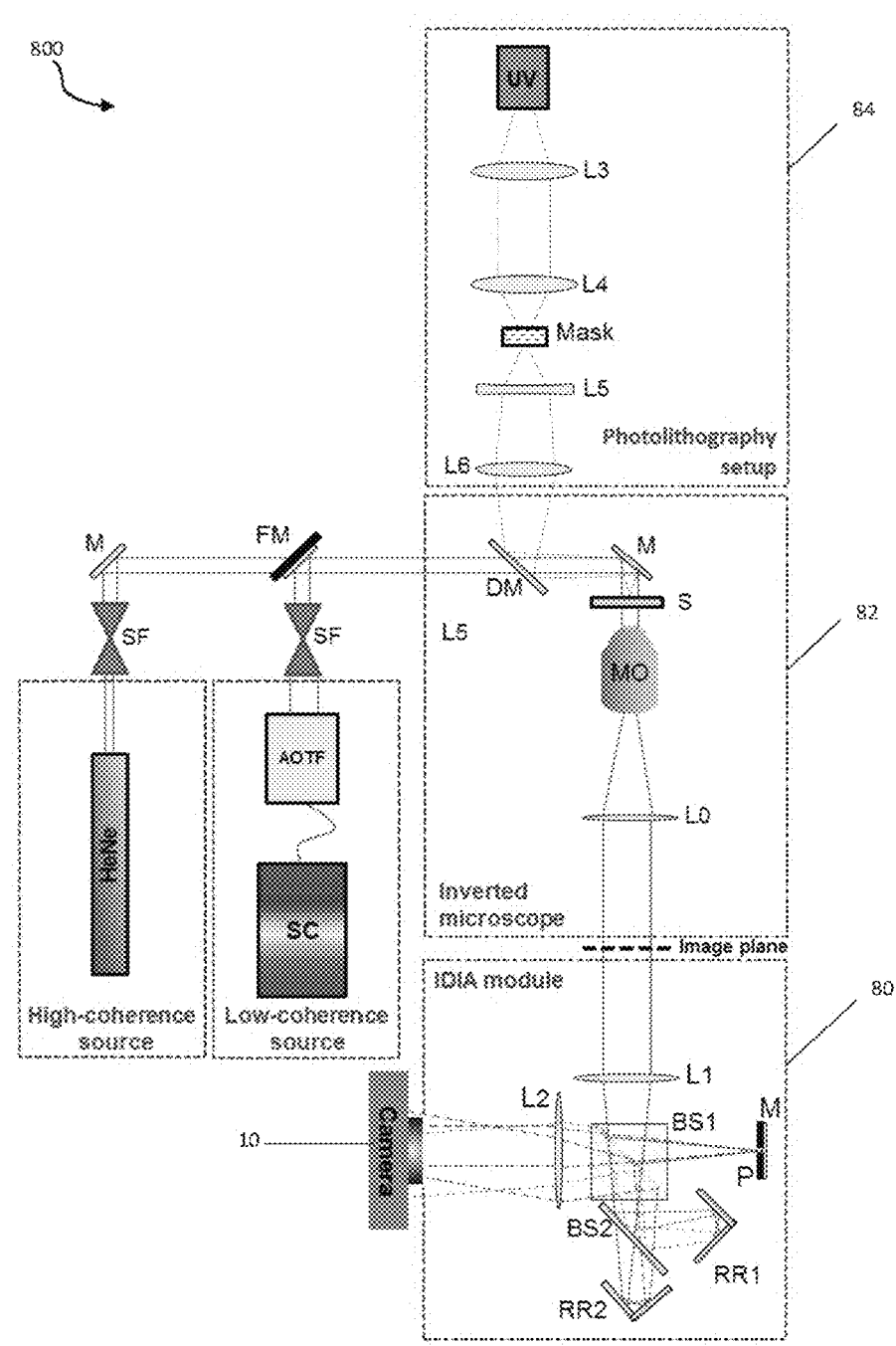
FIG. 13 shows an experimental setup including an inverted microscope, a photolithography setup, and the off-axis interferometric module presented in FIG. 1A used with a possible configuration of the system of the present invention.

Reference is made to FIG. 13 illustrating an experimental setup including an inverted microscope used with a possible configuration of the system of the present invention. The system 800 comprises an inverted transmission microscope 82, where the module 80 of the present invention is connected to its output. As illustrated for part of the experiments, low-coherence illumination is used, whereas for the other part of the experiments high-coherence illumination is used. In this specific and non-limiting example, the transmission microscope was illuminated by a low-coherence light source with a central wavelength of 510 nm and a full-width-at-half-maximum bandwidth of 6.1 nm, causing a coherence length of 13.58 µm. This light source is composed of a supercontinuum fiber-laser source noted as SC, connected to a computer-controlled acousto-optical tunable filter noted as AOTF. In addition, to demonstrate the usefulness of the technique for doubling the entire camera FOV for highly coherent sources as well, a HeNe (Helium-Neon laser) laser (with 632.8 nm wavelength) has been integrated as the illumination source of the microscope. The illumination delivered by the low coherent source and by the high coherent source passé through a spatial filter SF (e.g. two lenses and a confocally positioned pinhole) and are directed to the inverted transmission microscope 82 by using a mirror M. The selection between the low coherent source and the high coherent source is performed by using a flip mirror FM. A dichroic mirror DM is placed at the entry of the inverted transmission microscope 82 for receiving the illumination of the low coherence or high-coherence source and for directing a part of the illumination to a photolithography setup 84 and a part of the illumination to the sample S via a mirror M placed in the inverted transmission microscope 82. The inverted transmission microscope 82 contains three different infinity-corrected microscope objectives MO. The module 80 of the present invention is connected at the camera port of the microscope, and a digital camera 10 is connected to the output of the module. In this specific and non-limiting example, the diameter of pinhole P was 30 µm, and lenses L1 and L2 were achromatic lenses with focal lengths of 100 mm and 125 mm, respectively, creating total magnifications of 12×, 47× and 74×, respectively. A photolithography setup 84 integrated into the microscope 82 can also be used. The photolithography setup 84 includes an ultraviolet light-emitting diode, two lenses L3 and L4 focusing the ray emitted by the ultraviolet light-emitting diode onto a photolithography mask. The ray exits the photolithography mask and traverses two lenses L5 and L6 and penetrates the inverted microscope 82. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

By using this experimental setup, the inventors have demonstrated a significant increase in the interferometric FOV for IPM, which is one of the most rapidly growing interferometric fields in the last decade.

Using the partially-coherent source (which limits the interferometric FOV) without the technique of the present invention, off-axis interference on 1280×800 pixels of the camera was obtained on a total area of 6.66 mm×4.16 mm=27.7 mm$^2$. However, when using the technique of the present invention, which multiplexes the two interferometric FOVs, the off-axis interference area on the camera sensor was 4.16 mm×5.32 mm (800×1024 pixels of 5.2 µm each) for the first channel and 4.16 mm×6.66 mm (800×1280 pixels of 5.2 µm each) for the second channel.

To evaluate the system sensitivity, 240 sample-free interferograms were recorded during 12 seconds, and for each of them, the quantitative phase profile proportional to the optical thickness profile was calculated. Average temporal optical thickness stability levels of 0.71 nm and 0.63 nm were obtained for each of the two channels, respectively, and average spatial optical thickness stability levels of 0.88 nm and 0.91 nm were obtained for each of the two channels, respectively.

Interferograms of samples that are two large to fit into a single interferometric FOV were also recorded, as defined by the coherence length of the low-coherence source mentioned above. In these demonstrations, a 12% overlap between the channels was allowed to ease the stitching of the final images. Therefore, the total recorded interference area, after stitching the two channels, was 47.07 mm$^2$, which was 70% larger than the original recorded interference area, and even larger than the camera sensor size (35.44 mm$^2$). Without this 12% overlap, the total recorded area was increased to 49.84 mm$^2$, which is 80% larger than the original interference area. It should be noted that in this specific and non-limiting example, the camera sensor shape is not a square, and therefore the same interference areas from both channels cannot be recorded, so complete 100% increase in the recorded off-axis interference area is not possible.

Figures 15A, 15B:
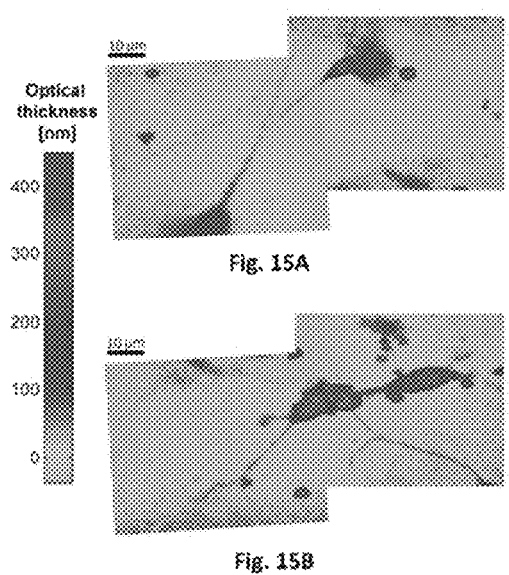
FIGS. 15A-15B show quantitative optical thickness maps of an embryonic rat brain specimen, as obtained by using by using the configuration shown in FIG. 13 of the present invention in a single camera exposure, enabling recording doubled FOV with fine neuronal details; in particular.

A specific and non-limiting configuration of system of the present invention was used to measure an optically transparent 1951-USAF test target under low-coherence illumination, limiting the off-axis interferometric FOV. Reference is made to FIG. 14A representing a multiplexed interferogram recorded in a single digital-camera exposure while using a 40× objective (defining optical resolution limit of 604.6 nm). FIG. 14B shows the absolute value of its spatial Fourier transform of the multiplexed interferogram, presenting the various well-separated elements seen in Eq. (2) and in the right side of FIG. 12B. From the spatial frequency plane shown in FIG. 14B, the elements marked by white boxes were digitally filtered to yield the quantitative optical thickness maps of the two FOVs. FIG. 14C shows the two stitched final optical thickness maps of the test target, obtained by stitching two thickness maps. To confirm that it is not possible to extend the FOV and keeping the same resolution limit by simply decreasing the magnification, the same test target was measured with a magnification reduced by a factor of two. This was done by adding a 4f lens imaging system after the microscope with a magnification of 0.5, while retaining the optical resolution limit. For a valid comparison, in both cases the filtering window (white box) size was equal to $2\omega_c$ (resulting from the microscope optical resolution limit). FIG. 14D shows the recorded regular off-axis interferogram with magnification reduced by a factor of two and FIG. 14E shows the corresponding spatial frequency plane, illustrating the overlap between the auto-correlation and the cross-correlation elements resulting from the demagnification. FIG. 14F shows the reconstructed final optical thickness profile obtained by filtering the cross-correlation element marked by a white box in FIG. 14E, demonstrating resolution limit of 0.77 µm. Therefore, if extending the recoded FOV by simply demagnifying, resolution loss occurs in the resulting image due to the overlapping between the autocorrelation and the cross-correlation elements, in addition to significant reduction of the image quality. It is possible to optimize the image quality of FIG. 14F by narrowing the spatial filtering window. However, resolution limit in this case decreases due to filtering of high spatial frequencies. The colorbar (grey level) represents the quantitative optical thickness of the sample in nanometers. In a specific and non-limiting example, the technique of the present invention can also be used for extending the FOV in low-coherence interferometric imaging of the quantitative optical thickness profile of embryonic rat brain specimen containing both neurons and glial cells, while using the 40× objective. Reference is made to FIGS. 15A-15B representing quantitative optical thickness maps of an embryonic rat brain specimen, as obtained by using the teachings of the present invention in a single camera exposure, enabling recoding wider FOV with the fine neuronal details. More specifically, FIG. 15A shows the stitched optical thickness map of a network of two nerves connected to an un-spread glial cell. FIG. 15B shows another example of an optical thickness map of brain cells in which a neural sample contains both nerves and glial cells. The colorbar (grey level) represents the quantitative optical thickness of the sample in nanometers. As seen these cells, though their relatively small size, have long extensions including micron-scale-diameter axons between the neurons in the network, and thus large magnification is needed to image them in detail. The optical thickness map of the nerve network cannot be recorded in a single exposure by regular off-axis interferometric setups using these specific camera and magnification, since a single off-axis interferometric FOV would not be wide enough to contain the entire detailed image. With respect to the optical thickness map of brain cells, although the image of this sample is larger than the off-axis interferometric FOV, two interferometric FOVs have been multiplexed and recorded in a single camera exposure.

Since the camera FOV and frame rate are interchangeable, the teachings of the present invention can also be used to increase dramatically the camera frame rate while recording the original off-axis interferometric FOV. To demonstrate this ability, a human sperm cell in motion has been imaged. Human spermatozoon has a small flat elliptical-shape head, with 3-5 µm diameter and 1 µm thickness. The spermatozoon tail is 50-60 µm long (including the neck connecting the tail to the head) and 200 to 400 nanometers in diameter. Interferometry has been shown to be useful for various sperm tests. However, in order to be able to quantitatively record a single spermatozoon with its fine-detailed tail using high magnification and high numerical-aperture microscope objective, a small pixel size camera must be used. Per a given camera, these restrictions might cause an optical FOV which is larger than the camera FOV, which reduces the user ability to record the long tail and the relatively large head in a single camera exposure.

In addition, the spermatozoon has a complex motion; its tail is characterized by three-dimensional helix rotation, and also its head has three-axial rotation. Furthermore, the entire spermatozoon moves rapidly in a speeds ranging from 48 to 162 µm/sec, making the scanning of its image during movement quite difficult. In this case, the system and method of the present invention provide the ability to quantitatively record structural spermatozoon anomalies such as double-tailed or double-headed morphologies, whereas the scan-free nature of this wide-field, doubled-FOV quantitative imaging technique provides the ability to image its fast and complex dynamics.

To be able to image an entire human spermatozoon in 80 frames per second under 63× magnification (provided by the 1.4-numerical-aperture, oil-immersion microscope objective), one would need a camera sensor size of 3.7 mm by 2.7 mm. With the camera used in the experiment performed by the inventors, containing a pixel size of 5.2 micron square, this sensor-size requirement translates to 710 by 512 pixels. However, this specific camera can record 80 frames per second for a FOV of 512 by 512 pixels, which is not enough for imaging the entire spermatozoon in motion. However, by implementing the technique of the present invention (with an overlapping area of 8%), the recorded FOV has been increased from 512 by 512 pixels to 512 by 980 pixels, while still enabling acquisition rates of 80 frames per second, which allows to see the entire spermatozoon motion.

Figures 16A, 16B, 16C, 16D:
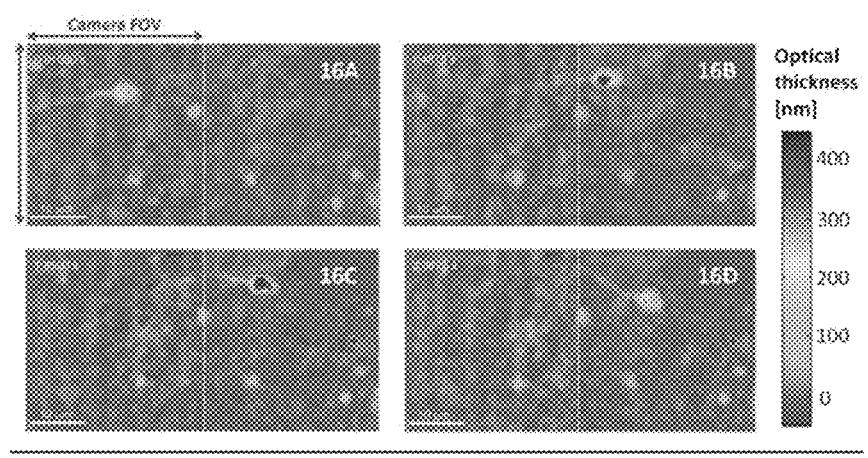
FIGS. 16A-16D show quantitative optical thickness maps of a human spermatozoon swimming in 50% semen and 50% PBS, as recorded by using the configuration shown in FIG. 13 of the present invention, enabling the acquisition of fast dynamics of the spermatozoon with fine details on a doubled FOV.

Reference is made to FIGS. 16A-16D representing quantitative optical thickness maps of a human spermatozoon swimming in 50% semen and 50% PBS, as recorded by using one possible configuration of the system of the present invention, enabling the acquisition of fast dynamics of the spermatozoon with fine details on a doubled FOV. The white dashed line indicates on the location of stitching between the two FOVs. The colorbar (grey level) represents the quantitative optical thickness of the sample in nanometers. FIGS. 16A-16D show the motion of the spermatozoon in space at four different time points, where it is possible to see the complex three-dimensional movement of the spermatozoon, including its head rotation and helix movement of the tail. As shown in FIG. 16B, even when the cell head passed completely to the second part of the frame, in the first part of the frame the entire tail is seen, demonstrating the need for the technique of the present invention to provide wider FOV in this case. The ability to quantitatively image the entire detailed movement of a single spermatozoon can be important for choosing a spermatozoon for in-vitro fertilization, since it is expected of providing better indication of the cell health based on both the cell detailed structure and its dynamics. Of course, other larger, faster (and probably more expensive) cameras exist, but even for them, the technique of the present invention provides doubled FOV or, alternatively, faster frame rate.

Figures 17A, 17B, 17C, 17D:
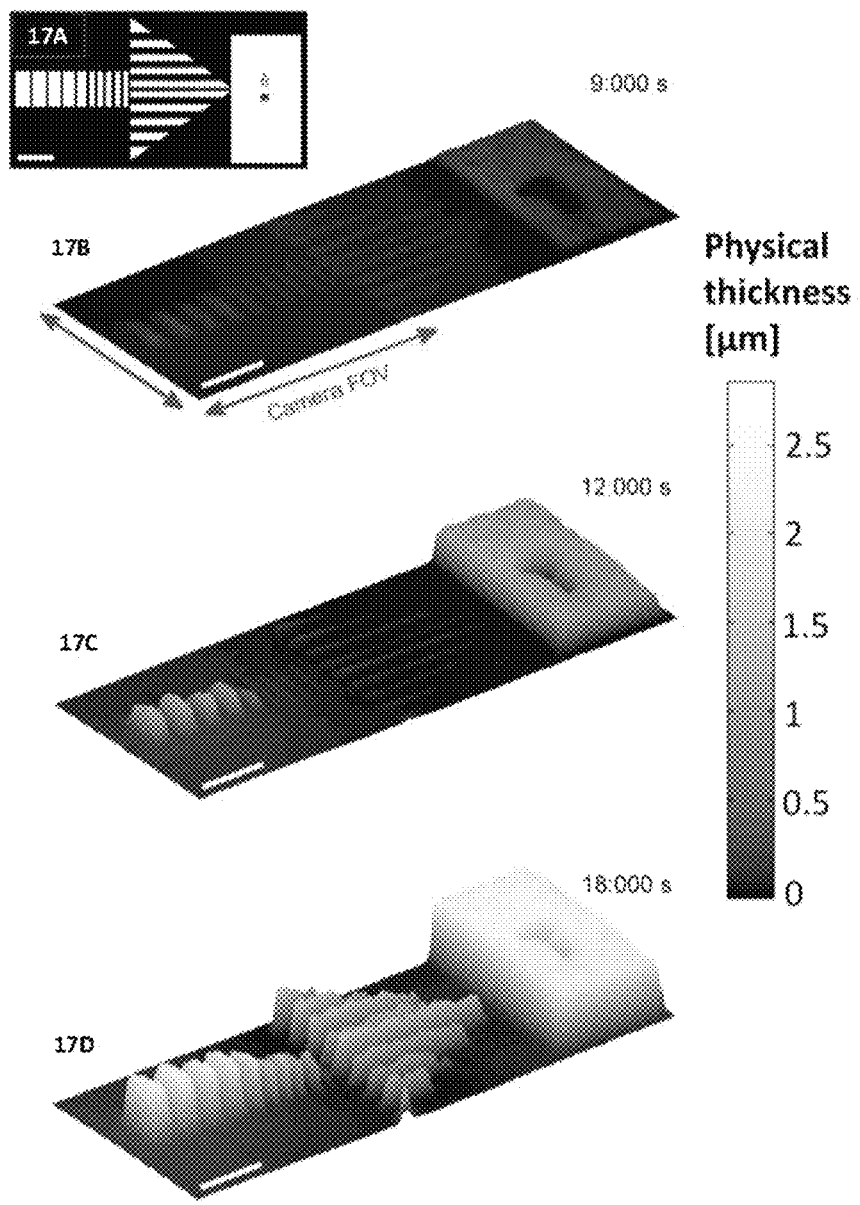
FIGS. 17A-17D show quantitative thickness imaging with a doubled camera FOV of a rapid lithography process, as obtained by using the configuration shown in FIG. 13 of the present invention; in particular, in FIG. 17A a photolithography mask used.

The present invention also enables to perform real-time nondestructive profilometry during lithography processes. The system is configured and operable to perform a quantitative thickness imaging during the rapid generation of thin elements by projection photolithography. It should be noted that the ability to record and test the quality of larger FOVs is important for mass production during the creation of lithographed elements, such as during the fabrication of integrated circuits, since larger number of elements or wider objects could be produced and examined at a given time. Reference is made to FIGS. 17A-17D representing quantitative thickness imaging with a doubled camera FOV of a rapid lithography process, as obtained by using a possible configuration of the system of the present invention. FIG. 17A shows a photolithography mask used. FIGS. 17B-17D show the physical thickness profile of the element at different time points during the curing of the photoresist in the lithography process. The colorbar (grey level) represents the quantitative physical thickness of the sample in micrometers. The white scale bar represents 150 µm. The inventors have integrated an additional lithography imaging system into the microscope, so that the lithographed element can be rapidly imaged during the curing of photoresist adhesive (NOA 81). This measurement can be used to control the curing depths and structures, and to provide feedback to the lithography system in real time. To this end, the inventors have used the system illustrated in FIG. 13. This setup included a 0.1× magnification that was capable of imaging the mask onto the objective image plane for projection photolithography. For this experiment, the mask shown in FIG. 17A was used. A 375 nm, 0.27 W/cm$^2$ light-emitting diode was used to illuminate the mask under Köhler illumination. A 490 nm cut-off filter was placed before the tube lens in the infinity space to prevent the diode light from reaching the detector (filter is not shown in the figure). Then, using the above-described transmission microscope, having the 10× objective, and integrated with the module of the present invention, the quantitative optical thickness profile of the lithographed element was imaged during the curing process. In this experiment, the highly coherent source was used in the input of the microscope, creating interference on the entire camera sensor, and therefore a doubled camera FOV was effectively recorded. FIGS. 17B-17D present the optical thickness profile of the element during curing of the photoresist at different time points. The structure and the refractive index of the polymer change during curing, whereas the physical thickness of the photoresist stays constant.

It should be noted that the lithographed elements could not be imaged by the given camera under the chosen magnification in a single camera exposure in an off-axis interferometric manner, since the projected image is larger than the camera sensor size. Here as well, scanning this dynamic element might result in loss of information. However, by implementing the teachings of the present invention, this element can be fully recorded during the adhesive curing, which provides the opportunity to control and test the lithography process. Therefore, the present invention enables stationary and dynamic biological sample imaging with fine details, as well as dynamic profiling during a lithography process.

The present invention also allows multiplexing three off-axis interferograms onto a single camera sensor without loss in the imaging parameters or in the temporal resolution.

Figure 18:
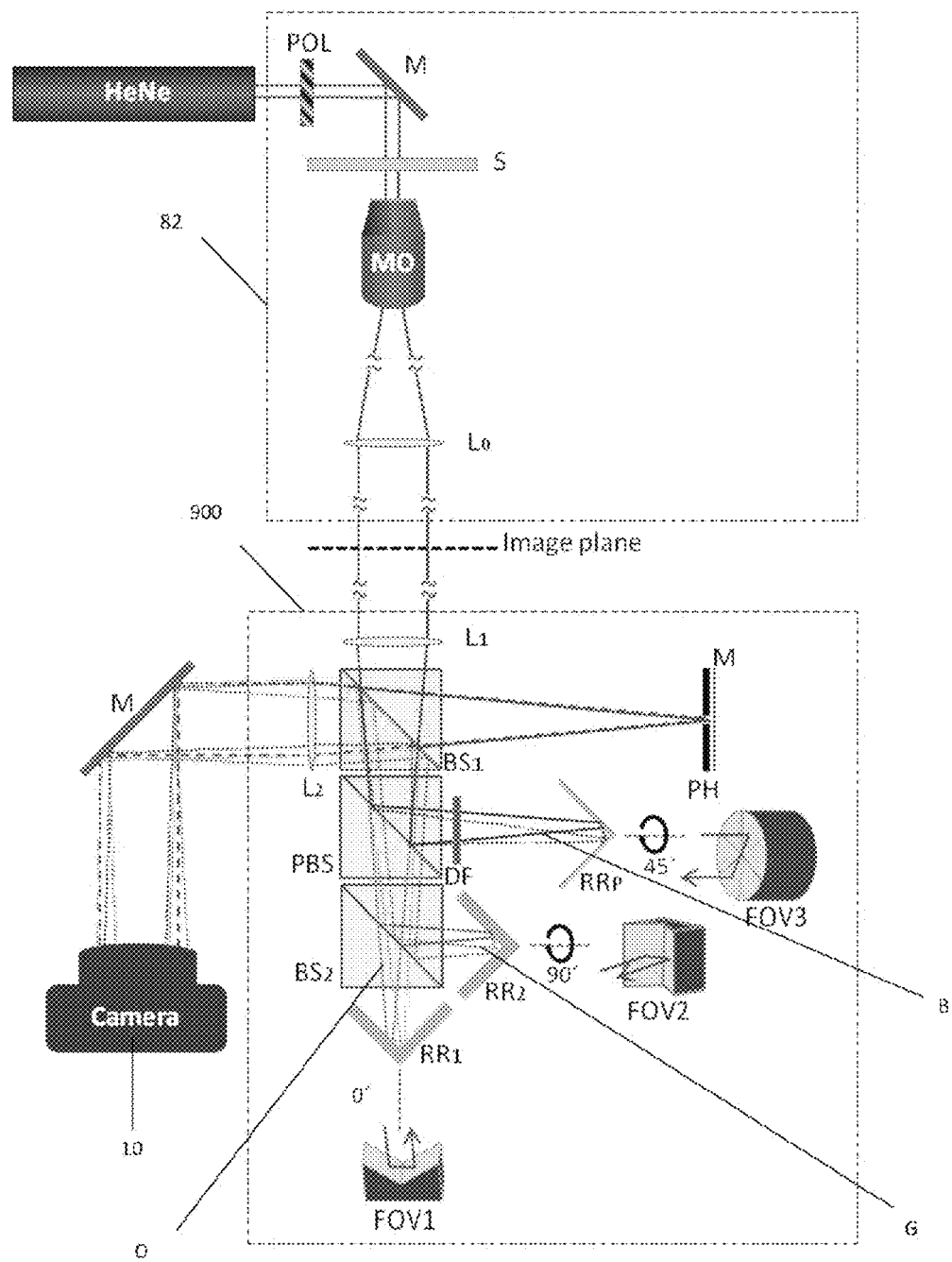
FIG. 18 shows one possible configuration of the off-axis interferometric module presented in FIG. 3, connected at the output of a simple inverted microscope.

Reference is made to FIG. 18 presenting another possible configuration of the interferometric module according to some embodiments of the present invention. The B beams represent S-polarized light, while the O and the G beams represent P-polarized light.

The interferometric module 900 is connected at the output of a simple inverted transmission microscope 82 illuminated by a He—Ne laser (e.g. Helium-Neon Laser wavelength of 632.8 nm). The inverted transmission microscope 82 contains a microscope objective (MO) (e.g. 40×, 0.66 NA, infinity corrected), and a tube lens ($L_O$) (e.g. focal length 16 cm). The sample is projected onto the image plane at the output of the microscope, where the interferometric module 900 is placed. The interferometric module 900 includes inter alia lenses $L_1$ and $L_2$ (e.g. focal lengths: 16 cm and 15 cm), beam splitter $BS_1$ and $BS_2$, a polarizing beam-splitter PBS (e.g. PBS251, Thorlabs), a pinhole PH (e.g. 30 μm pinhole), two retro-reflectors $RR_1$ and $RR_2$ (e.g. made out of two mirrors connected at a right angle), a total-internal-reflection prism retro-reflector $RR_p$ (e.g. PS975M-A, Thorlabs), a density filter DF, and a mirror M. The magnified image at the microscope output is Fourier transformed by lens $L_1$, and split by beam-splitter $BS_1$ into the preliminary reference and sample beams. The final reference beam is then created by spatially filtering the sample modulation from the preliminary sample beam using pinhole PH. The preliminary sample beam at the exit of $BS_1$ is split into three sample beams by beam splitters PBS and $BS_2$. At each beam splitter exit, there is a retro-reflector, which reflects the beam back in a different angle, while shifting the Fourier-domain axis transversally. The beams reflected from $RR_1$ and $RR_2$ are orthogonally rotated compared to each other, and the beam reflected from $RR_p$ is rotated at 45 degrees compared to the beam from each of the other two retro-reflectors. Each of the three sample beams is then combined with the final reference beam using the beam-splitters, and inverse Fourier transformed onto the camera 10 (e.g. monochrome digital camera (DCC1545M, Thorlabs) having a sensor size of 5.32 mm×6.65 mm) by lens $L_2$, which is positioned in 4f lens configuration with lens $L_1$. Due to the Fourier shift induced by the retro-reflectors, three off-axis interferences are obtained on the camera 10, with fringes rotated at 45 degrees compared to each other. Each retro-reflector also rotates the sample image. Therefore, if the projected sample image is larger than the camera sensor size, the three sample FOVs are projected onto the same camera sensor. If the sample is mostly transparent (such as live cells in vitro), all sample FOVs can be imaged at once.

To avoid unwanted interferences between the sample beams, polarization effects are used. First, the sample is illuminated by 45-degree polarized light (using linear polarizer POL 45° polarizer in front of the laser). Therefore, the reference beam has both P and S polarization states. After splitting the beam in the polarizing beam-splitter PBS, S polarization is reflected and P polarization is transmitted. Therefore, the two FOVs reflected by $RR_1$ and $RR_2$ are P-polarized, and after they interfere with the P-polarized part of the reference beam, two orthogonal off-axis interferograms are created on the camera. $RR_1$ and $RR_2$ are built by connecting two mirrors at 90 degrees. $RR_p$, on the other hand, is a total-internal-reflection prism, turning the linearly polarized light into elliptically polarized light, which enables to adjust the retro-reflector so that the S-polarization will not be blocked by PBS. Using right-angle mirror retro-reflector instead $RR_p$ would rotate the light polarization upon reflection, and the light would be blocked by PBS.

Figures 19A, 19B, 19C:
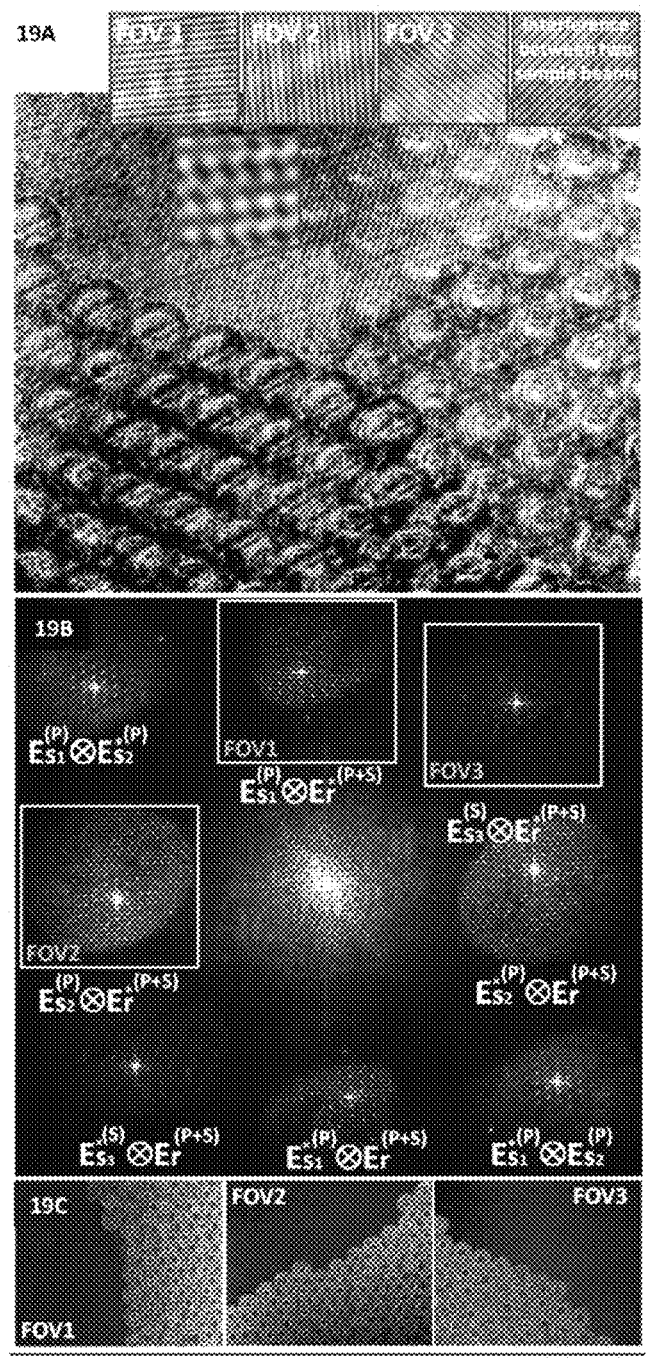
FIGS. 19A-19C show imaging of a 15-μm clear polymer microspheres obtained by using the system according to some embodiments of the present invention; in particular

Reference is made to FIGS. 19A-19C presenting 15-μm clear transparent polymer microspheres imaging measurement using the system of FIG. 18. As shown in FIG. 19A, four interferences are recorded by the camera at once—three interferences between the three sample beams and the reference beam, and another one between the two P-polarized sample beams. This multiplexed interferogram is described as:

$$|E_{s1}^{(P)}+E_{s2}^{(P)}+E_{s3}^{(S)}+E_r^{(S+P)}|^2 = |E_{s1}^{(P)}|^2+|E_{s2}^{(P)}|^2+ \\ |E_{s3}^{(S)}|^2+|E_r^{(S+P)}|^2+E_{s1}^{(P)}E_{s2}^{*(P)}+E_{s1}^{*(P)}E_{s2}^{(P)}+ \\ E_{s1}^{(P)}E_r^{*(S+P)}+E_{s1}^{*(P)}E_r^{(S+P)}+E_{s2}^{(P)}E_r^{*(S+P)}+ \\ E_{s2}^{*(P)}E_r^{(S+P)}+E_{s3}^{(S)}E_r^{*(S+P)}+E_{s3}^{*(S)}E_r^{(S=P)},$$ (3)

where $E_{s1}^{(P)}$ and $E_{s2}^{(P)}$ are the P-polarized sample beams, $E_{s3}^{(S)}$ is the S-polarized sample beam, and $E_r^{(S+P)}=E_r^{(S)}+E_r^{(P)}$ is the reference beam. The first four elements in the right side of Eq. (3) represent the wave intensities, and in the Fourier domain (shown in FIG. 19B) are translated to auto-correlations located at the center. The other eight elements create the off-axis interferences, which are rotated at 45 degrees compared to each other. In the Fourier domain, the resulting cross-correlations are shifted to different locations far from the origin as shown in FIG. 19B. $\hat{x}$ between Es represents two-dimensional spatial convolution. Therefore, the phase profiles of three FOVs can be reconstructed as shown in FIG. 19C. It should be noted that $E_{s3}^{(S)}$ does not interfere with $E_{s1}^{(P)}$ or $E_{s2}^{(P)}$ due to orthogonal polarization. The digital reconstruction process includes spatial filtering, applied digitally three times, one for each cross-correlation between a sample beam and the reference beam. The first reconstruction is applied when filtering $E_{s1}^{(P)}E^*{_r}^{(S+P)}$ the second one is when filtering $E_{s2}^{(P)}E^*{_r}^{(S+P)}$, and the third one is when filtering $E_{s3}^{(S)}E^*{_r}^{(S+P)}$. Each of the filtered regions is indicated in FIG. 19B by a white box. The ability to multiplex several interferograms into one is due to a property previously considered as a disadvantage of the off-axis inteferometric geometry, according to which the Fourier domain should be at least eight times broader than the highest spatial frequency recorded, typically related to the optical resolution limit. Under the assumption that the maximum spatial frequencies in the x and the y directions are equal, this off-axis encoding creates an empty space for additional cross-correlation elements in other directions around the Fourier-domain origin, to which additional data is compressed without overlaps with the other elements.

Figure 20:
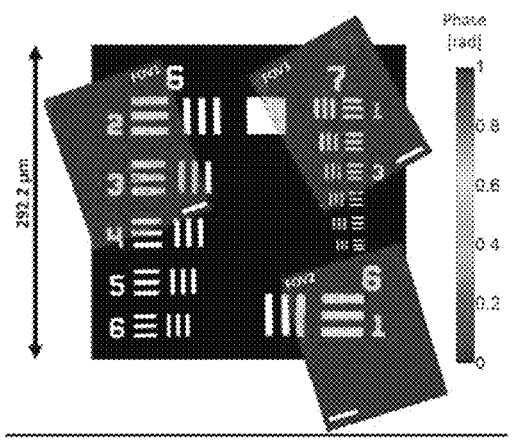
FIG. 20 shows quantitative phase imaging of a 1951 US air force phase target obtained by using the system of FIG. 18.

An optically transparent 1951 US air force test target has been created on a glass plate using a photolithography process of UV-cured adhesive. Reference is made to FIG. 20 showing the test target containing groups 6 and 7, and quantitative phase profiles of the three FOV imaged simultaneously using the technique of the present invention. Since the magnified image size of the test target is 10.96 mm×10.96 mm, which is larger than the camera sensor size (5.32 mm×6.65 mm), it could not be recorded at once without using the teachings of the present invention.

Figures 21A, 21B, 21C, 21D:
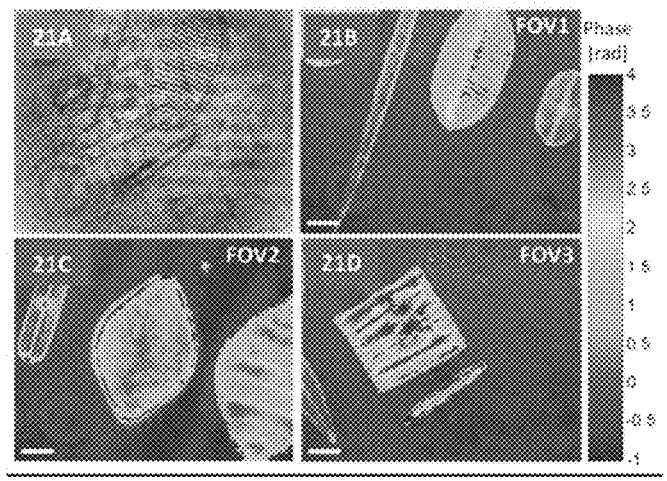
FIG. 21A-21D show quantitative phase imaging of microscopic diatom shells obtained by using the system of FIG. 18; in particular.

The teachings of the present invention were also used to quantitatively image microscopic diatom shells. Reference is made to FIG. 21A showing a multiplexed off-axis interferogram containing three FOVs in which several overlapping diatoms can be seen. FIGS. 21B-21D present three quantitative unwrapped phase profiles reconstructed from the three FOVs of the multiplexed interferogram of FIG. 21A. It can be seen that the shells presented in the multiplexed interferogram are actually three separable FOVs, acquired simultaneously using a single camera exposure. The white scale bars indicate 20 µm.

Figure 22:
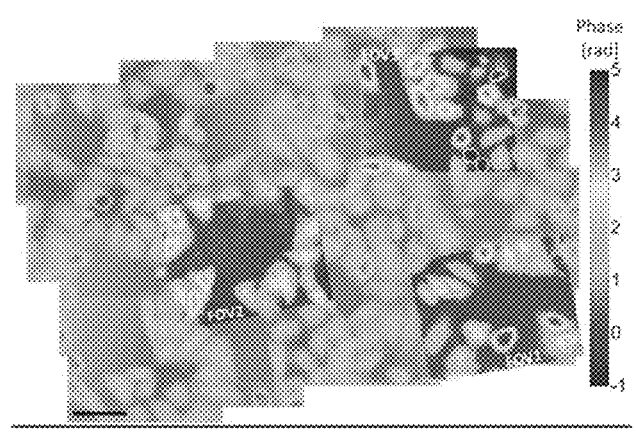
FIG. 22 shows quantitative phase imaging of HeLa cells obtained by using the system of FIG. 18 according to some embodiments of the present invention.

Reference is made to FIG. 22 showing quantitative phase imaging of live HeLa cells (human cervical cancer, purchased from ATCC). As presented in FIG. 22, a broad area of 4×4 frames was first scanned. Next, the system of the present invention was used to record three FOVs from the sample simultaneously. The three quantitative unwrapped phase images are reconstructed from a single multiplexed interferogram acquired simultaneously, without any scanning. The black scale bar indicates 50 µm.

Therefore, the principles of the present invention can also be used for tripling the off-axis interferometric FOV acquired in a single camera exposure. The fact that orthogonal polarizations do not interfere was used in order to optimize the Fourier-domain usage. The three simultaneously obtained FOV interferences do not overlap in the Fourier domain, so that all of them can be acquired at once. Highly coherent source was used to obtain interference on the entire camera sensor, thus tripling the entire camera FOV. The FOVs can be adjacent, so that a single continuous FOV can be reconstructed which is three times larger than the original FOV. The principles of the present invention enables to obtain, among others, quantitative phase imaging of a phase test target and biological samples, where objects (e.g. cells) located in the extended FOV can be investigated simultaneously.

The invention claimed is:

1. An optical arrangement comprising:
   a beam splitter/combiner unit and at least two optical elements for receiving light from an off-axis interferometer device, which has a certain off-axis interferometric FOV and at least two substantially overlapping optical paths towards an optical detector, wherein said beam splitter/combiner unit is configured for receiving a reference beam and a modulated beam from the off-axis interferometer device and splitting said modulated beam into first and second light beams of the same amplitude and phase modulation,
   said at least two optical elements accommodated in first and second optical paths of said first and second light beams and configured for reflecting said first and second light beams back towards said beam splitter/combiner unit; at least one of the two optical elements being configured for rotating said first and second light beams and;
   said beam splitter/combiner unit is configured for receiving and combining reflections of each of the first and second light beams with the reference beam to produce at least two output combined beams propagating along said at least two substantially overlapping optical paths;
   said at least two output combined beams being thereby two off-axis overlapping interferograms to be optically multiplexed into a single off-axis interferogram having an extended off-axis interferometric FOV, as compared to the certain off-axis interferometric FOV.

2. The optical arrangement of claim 1, wherein at least one of said at least two optical elements comprises at least one retro-reflector, at least one mirror, at least one right-angle prism, at least one corner reflector, at least one sided prism based retro-reflector, at least one cat's eye, at least one shifted mirror, at least one phase-conjugate mirror.

3. The optical arrangement of claim 1, wherein said optical elements are accommodated with respect to each other at a controllable interference angle to thereby control the off-axis interference.

4. The optical arrangement of claim 1, wherein said optical elements are accommodated with respect to each other at a controllable position to thereby control the off-axis interference.

5. The optical arrangement of claim 1, comprising at least one polarizing element to eliminate unwanted interferences.

6. The optical arrangement of claim 5, comprising two polarizing elements orthogonal with respect to each other.

7. An off-axis interferometric module comprises:
   a first beam splitter/combiner unit for receiving an input beam and splitting said input beam into first and second light beams;
   a Fourier optics assembly comprising two lenses;
   a first lens being accommodated at the input of said first beam splitter and a second lens being accommodated at the output of said first beam splitter;
   a reflective surface accommodated in the first optical path of said first light beam to direct said first light beam back to said first beam splitter/combiner;
   a spatial filter accommodated in front of the reflective surface for receiving and spatially filtering said first light beam to thereby create a reference beam with respect to a second modulated beam;
   a second beam splitter/combiner unit for receiving said second modulated light beam, splitting said second modulated light beam into third and fourth light beams;
   at least two Fourier shifting elements accommodated in the first and second optical paths of the third and fourth light beams for creating a Fourier-plane shift of said third and fourth light beams and reflecting said third and fourth light beams back towards said second beam splitter/combiner unit;
the reflected reference beam and the third and fourth beams creating at least two interferences respectively being two off-axis overlapping interferograms to be optically multiplexed into a single off-axis interferogram.

8. The module of claim 7, wherein said Fourier optics assembly is configured such that one lens is in a 4f configuration with respect to the other.

9. The module of claim 7, wherein said at least one Fourier shifting element comprises at least one retro-reflector, at least one mirror, at least one right-angle prism, at least one corner reflector, at least one sided prism based retro-reflector, at least one cat's eye, at least one shifted mirror, at least one phase-conjugate mirror.

10. The module of claim 9, wherein one of said retro-reflector is configured for shifting the third beam in one plane and the other retro-reflector is configured for shifting the fourth beam in a second plane.

11. The module of claim 7, comprising at least two polarizing elements each placed upstream to the at least two Fourier shifting elements to avoid unwanted interferences.

12. The module of claim 11, wherein said polarizing elements are orthogonal with respect to each other.

13. The module of claim 7, comprising three beam splitters.

14. The module of claim 7, wherein at least one of said first and second beam splitters includes at least one of a double and triple beam splitter.

15. The module of claim 7, wherein said at least two retro-reflectors are oriented at a predetermined angle with respect to each other.

16. The module of claim 7, wherein said spatial filter comprises a pinhole or a grating element.

17. A sample inspection and quantitative imaging system, comprising:
light collecting and focusing optics configured and operable for collecting an input beam from a predetermined sample surface and focusing it onto an image plane;
a light source illuminating said sample surface;
an off-axis interferometric module accommodated in a path of the light collected by the light collecting and focusing optics, and being connected at the output of an imaging system; the off-axis interferometric module being as defined in claim 7.

18. The system of claim 17, comprising a control unit configured and operable to receive from said detector a multiplexed interferogram containing at least two overlapping images and to apply a digital spatial filtering a predetermined number of times to thereby extract an extended FOV quantitative profile of the sample.

19. The system of claim 17 wherein said imaging system comprises a microscope.

20. The system of claim 17 wherein said off-axis interferometric module is positioned to located an image plane of said off-axis interferometric module on said detector such that the multiplexed interferogram contains at least two overlapping images acquired simultaneously in a single detector exposure.

21. The system of claim 17, wherein said light source creates a polarized beam.

22. The system of claim 17, wherein said light source comprises a highly coherent source.

23. A sample inspection and quantitative imaging system, comprising:
light collecting and focusing optics configured and operable for collecting an input beam from a predetermined sample surface and focusing it onto an image plane;
a light source illuminating said sample;
an off-axis interferometer device accommodated in a path of the light collected by the light collecting and focusing optics, and being connected at the output of an imaging system; wherein the device is configured for defining at least two substantially overlapping optical paths towards an optical detector; and;
an optical arrangement to be connected to said off-axis interferometer device as defined in claim 1.

24. A method comprising:
receiving a reference beam and a modulated beam from an off-axis interferometer device and splitting said modulated beam into first and second light beams of the same amplitude and phase modulation by using a beam splitter/combiner unit,
reflecting said first and second light beams back towards said beam splitter/combiner unit;
rotating said first and second light beams;
receiving and combining reflections of each of the first and second light beams with the reference beam to produce at least two output combined beams propagating along at least two substantially overlapping optical paths; wherein said at least two output combined beams create two off-axis overlapping interferences to be optically multiplexed into a single off-axis interferogram having an extended off-axis interferometric FOV, as compared to the certain off-axis interferometric FOV.

25. The method of claim 24, comprising controlling the off-axis interference by controlling at least one of interfering wave angle by the position of optical elements configured for rotating said first and second light beams.

26. The method of claim 24, comprising receiving and spatially filtering said first light beam to thereby create a reference beam with respect to the second modulated beam; splitting said second modulated light beam into third and fourth light beams; and creating a Fourier-plane shift of said third and fourth light beams and reflecting said third and fourth light beams back towards a second beam splitter/combiner unit; wherein the reflected reference beam and the third and fourth beams creates at least two interferences respectively being two off-axis overlapping interferograms to be optically multiplexed into a single off-axis multiplexed interferogram.

27. The method of claim 24, comprising shifting the third beam in one plane and shifting the fourth beam in a second plane.

28. The method of claim 24, comprising collecting an input beam from a predetermined sample surface and focusing it onto an image plane; illuminating said sample surface.

29. The method of claim 24, comprising receiving a multiplexed interferogram containing at least two overlapping images and applying a digital spatial filtering a predetermined number of times to thereby extract an extended FOV quantitative profile of the sample.

30. The method of claim 29, comprising acquiring the multiplexed interferogram simultaneously in a single detector exposure.

* * * * *